(12) United States Patent
Hawkins, III

(10) Patent No.: US 12,440,724 B2
(45) Date of Patent: *Oct. 14, 2025

(54) INDOOR BICYCLE ADJUSTMENT METHOD AND SYSTEM

(71) Applicant: Wahoo Fitness LLC, Atlanta, GA (US)

(72) Inventor: Harold M. Hawkins, III, Atlanta, GA (US)

(73) Assignee: Wahoo Fitness LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,423

(22) Filed: Dec. 23, 2022

(65) Prior Publication Data

US 2023/0338773 A1 Oct. 26, 2023

Related U.S. Application Data

(63) Continuation of application No. 17/006,632, filed on Aug. 28, 2020, now Pat. No. 11,534,657.

(Continued)

(51) Int. Cl.
*A63B 22/06* (2006.01)
*A63B 21/00* (2006.01)
(Continued)

(52) U.S. Cl.
CPC .... *A63B 22/0605* (2013.01); *A63B 21/00069* (2013.01); *A63B 21/00076* (2013.01); *A63B 21/005* (2013.01); *A63B 21/0052* (2013.01); *A63B 21/0058* (2013.01); *A63B 21/225* (2013.01); *A63B 21/4035* (2015.10); *A63B 22/0046* (2013.01); *A63B 23/0476* (2013.01); *A63B 24/0062* (2013.01); *A63B 24/0087* (2013.01); *A63B 71/0622* (2013.01); *A63B 2022/0033* (2013.01); *A63B 2022/0617* (2013.01); *A63B 2022/0623* (2013.01); *A63B 2022/0641* (2013.01); *A63B 2024/009* (2013.01); *A63B 2024/0093* (2013.01);
(Continued)

(58) Field of Classification Search
None
See application file for complete search history.

(56) References Cited

U.S. PATENT DOCUMENTS

2003/0092534 A1   5/2003  Forcillo
2004/0237666 A1* 12/2004  Winkenbach ............ B62K 3/02
                                                                  73/862.49
(Continued)

FOREIGN PATENT DOCUMENTS

CN  201692567 U   1/2011
CN  102826146 A  12/2012
(Continued)

*Primary Examiner* — Shila Jalalzadeh Abyaneh
(74) *Attorney, Agent, or Firm* — Polsinelli PC; Gregory P. Durbin

(57) ABSTRACT

A stationary indoor "smart" training bicycle includes a unique combination of adjustable components to provide configurable dimensions to adjust the frame size of the indoor bicycle to properly fit a rider. A system is also provided to process a digital image of an outdoor bicycle and determine and translate dimensions and adjustments to the indoor bicycle to match one or more dimensions (lengths, angles, separations, etc.) of the outdoor bicycle.

14 Claims, 18 Drawing Sheets

Related U.S. Application Data

(60) Provisional application No. 62/903,483, filed on Sep. 20, 2019, provisional application No. 62/893,649, filed on Aug. 29, 2019, provisional application No. 62/893,563, filed on Aug. 29, 2019.

(51) Int. Cl.
*A63B 21/005* (2006.01)
*A63B 21/22* (2006.01)
*A63B 22/00* (2006.01)
*A63B 23/04* (2006.01)
*A63B 24/00* (2006.01)
*A63B 71/06* (2006.01)

(52) U.S. Cl.
CPC ............... *A63B 2024/0096* (2013.01); *A63B 2071/0638* (2013.01); *A63B 2071/0644* (2013.01); *A63B 2071/0677* (2013.01); *A63B 2209/08* (2013.01); *A63B 2220/05* (2013.01); *A63B 2220/10* (2013.01); *A63B 2220/18* (2013.01); *A63B 2220/30* (2013.01); *A63B 2220/40* (2013.01); *A63B 2220/64* (2013.01); *A63B 2220/80* (2013.01); *A63B 2220/803* (2013.01); *A63B 2220/807* (2013.01); *A63B 2220/833* (2013.01); *A63B 2225/09* (2013.01); *A63B 2225/093* (2013.01); *A63B 2225/096* (2013.01)

(56) References Cited

U.S. PATENT DOCUMENTS

| | | |
|---|---|---|
| 2007/0142177 A1 | 6/2007 | Simms et al. |
| 2008/0058170 A1 | 3/2008 | Giannascoli et al. |
| 2010/0306160 A1 | 12/2010 | Simms |
| 2011/0185803 A1* | 8/2011 | Demajistre ............ B62J 99/00 73/147 |
| 2013/0065733 A1 | 3/2013 | Kautz et al. |
| 2014/0221158 A1 | 8/2014 | Mabey et al. |
| 2014/0378280 A1* | 12/2014 | Kristiansen ........ G06Q 30/0621 482/61 |
| 2015/0055086 A1 | 2/2015 | Fonte et al. |
| 2015/0119203 A1* | 4/2015 | Kautz ................... A61B 90/30 482/57 |
| 2017/0103160 A1 | 4/2017 | Hynes |
| 2017/0327184 A1* | 11/2017 | Contello ................. B62M 9/04 |
| 2017/0332956 A1* | 11/2017 | Bigolin ................ A61B 5/1077 |
| 2019/0384874 A1 | 12/2019 | Riley et al. |

FOREIGN PATENT DOCUMENTS

| | | |
|---|---|---|
| CN | 109603091 A | 4/2019 |
| CN | 208756882 U | 4/2019 |
| EP | 1410984 A1 | 4/2004 |

* cited by examiner

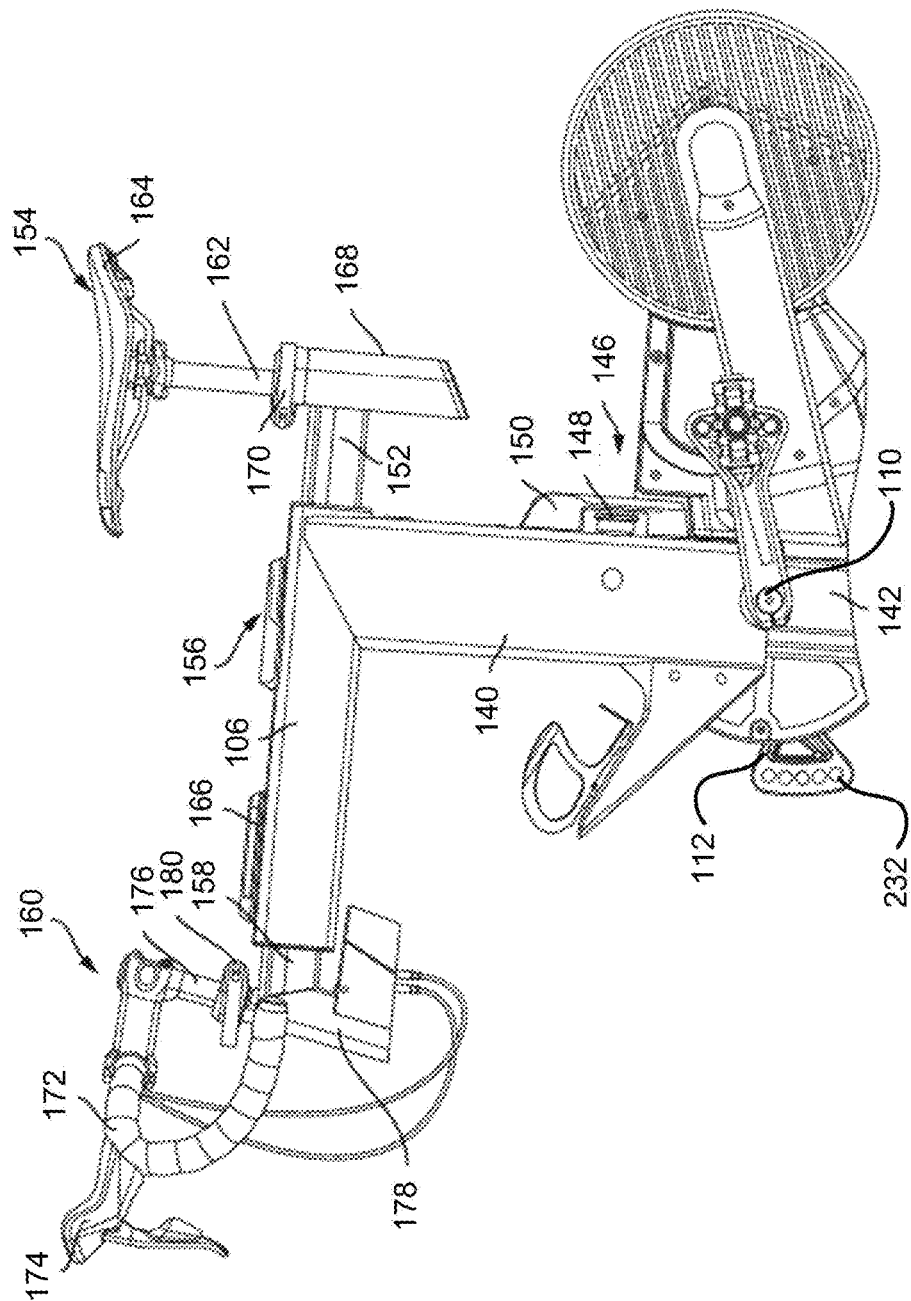

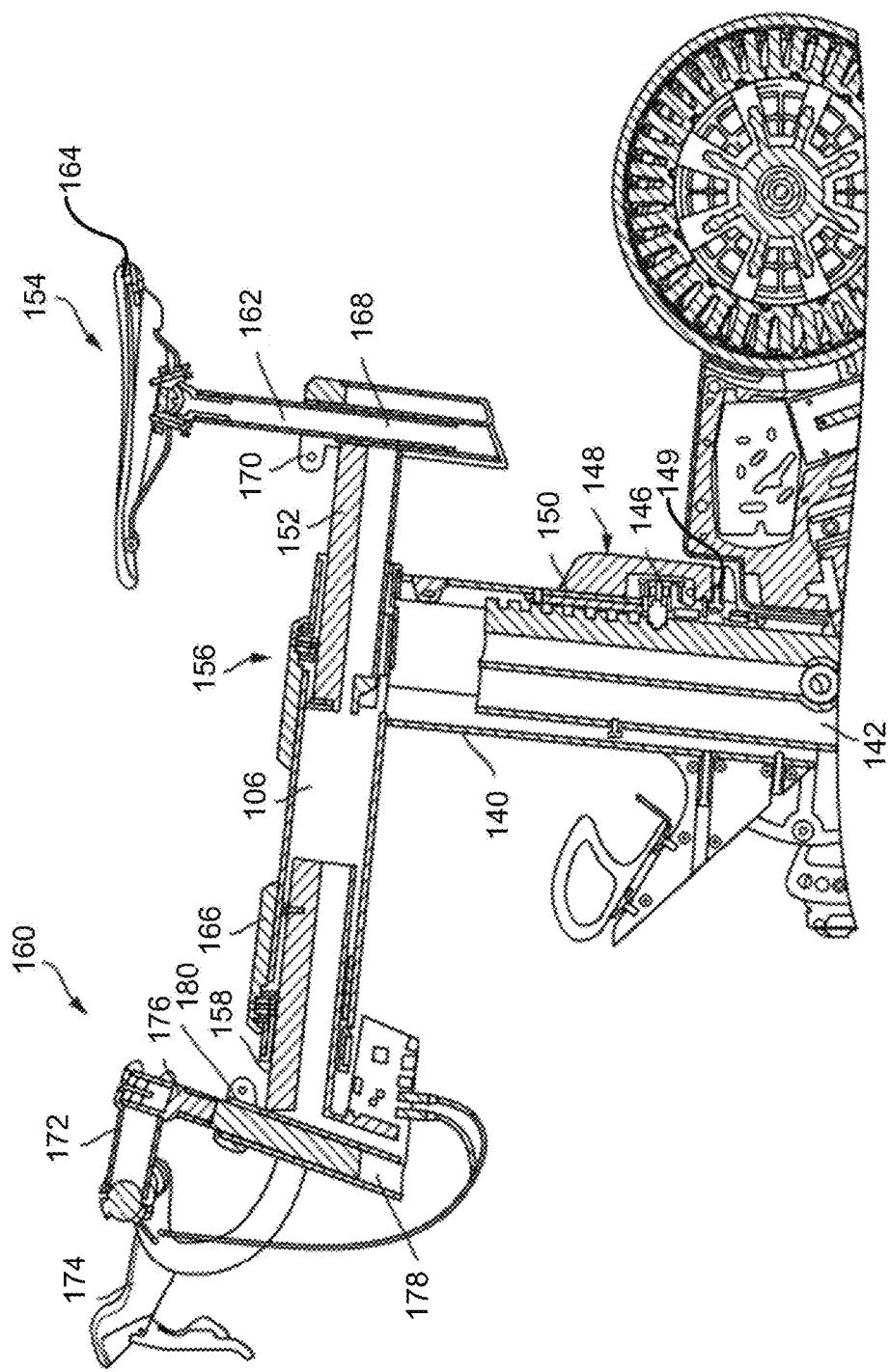

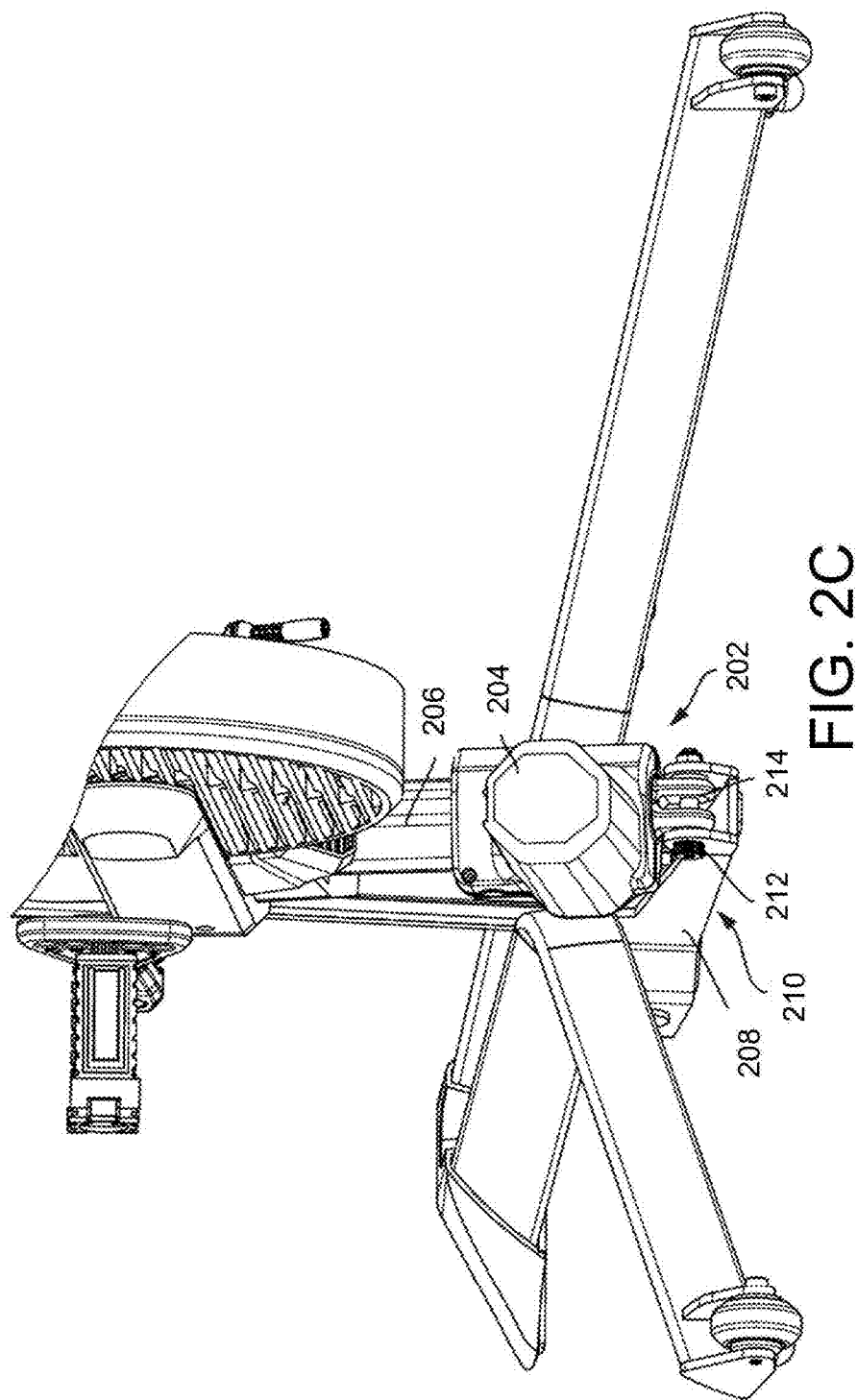

INDOOR BICYCLE ADJUSTMENT METHOD AND SYSTEM

CROSS-REFERENCE TO RELATED APPLICATIONS

The present patent application is a continuation of U.S. Nonprovisional patent application Ser. No. 17/006,632 tiled "Indoor Bicycle Adjustment Method and System" filed Aug. 28, 2020, which claims priority under 35 U.S.C. § 119 to U.S. Provisional Patent Application No. 62/893,563 titled "Bicycle Training Device" filed on Aug. 29, 2019, U.S. Provisional Patent Application No. 62/893,649 titled "Stationary Bicycle Adjustment Method and System" filed on Aug. 29, 2019, and U.S. Provisional Patent Application No. 62/903,483 titled "Stationary Bicycle Adjustment Method and System" filed on Sep. 20, 2019, the entire contents of which are incorporated herein by reference for all purposes.

TECHNICAL FIELD

Embodiments of the present disclosure generally relate to systems and methods for a bicycle training device, and more specifically for a method and system for adjusting one or more dimensions of an adjustable stationary bicycle to customize the fit of the adjustable bicycle to fit a rider.

BACKGROUND

Indoor cycling training, with the right equipment, can be very enjoyable. Additionally, busy schedules, bad weather, focused training, and other factors inspire bicycle riders, ranging from the novice to the professional, to train indoors. Numerous indoor training options exist, including numerous different types of exercise bicycles that have been developed over the years. A typical exercise bicycle may look similar to an actual bicycle including a seat, handlebars, pedals, crank arms, a drive sprocket and chain but often without wheels. Other indoor cycling training devices include indoor trainers that allow a rider to mount her actual bicycle to the trainer, with or without the rear wheel, and then ride the bicycle indoors with the trainer providing the resistance against pedaling. Both exercise bikes and trainers may utilize some form of adjustable resistance to provide varying levels of indoor training and/or exercise.

While useful for training indoors, conventional exercise bicycles offer an experience that is often uncomfortable, dissimilar from riding a bicycle (outdoor bicycle) outdoors, and otherwise suffering from various insufficiencies. For example, many conventional exercise bicycles include a heavy rigid frame, which can be excellent for exercising but is not meant to have the same feel as riding outdoors. While exercise bicycles provide many options for changing dimensions, they are typically unable to be adjusted in sufficient dimensions to replicate all of the dimensional relationships between frame members and handlebars, seat, etc., found in a well fit outdoor bike. This may contribute to the experience of using a stationary bicycle feeling markedly different than riding a conventional outdoor bicycle that includes wheels and is intended to propel the rider forward when the drive crank is engaged or operated by the rider, as opposed to stationary bicycles that are designed to remain in place during use of the bicycle.

A bike "fit" refers to the concept of fitting the adjustable dimensions of a bike to that of a particular rider to meet that rider's anatomical dimensions. Because every person is different—height, arm length, torso length, leg length, foot size, etc., a bike right out of the box will not fit every person. Proper fit, however, is important for riding comfort, avoiding injuries, optimizing cycling efficiency, and other factors. A simple bike fit involves adjusting seat height and the fore and after position of the seat on the rails. In a more sophisticated professional setting, an expert will help a rider select a frame with proper geometry, the handlebar height and reach will be adjusted through spacers and a specific stem purchased and retrofitted to the bike for proper reach, the seat height and fore and aft position will be adjusted relative to the handlebar height and reach for the frame as well as the crank arm length and bottom bracket position. In some cases, crank arms will be purchased if the fit demands a length different from what comes with bike.

A professional bike fit can be hundreds of dollars but many riders believe the benefits outweigh the costs. Besides the cost, a professional bike fit has some drawbacks in that it is often dependent on the dimensions of the bike being fit and hence is not necessarily portable to other bikes. So, a person with multiple bikes may need to invest in a bike fit for each bike. Moreover, the rider may not be able to easily or accurately apply the fit to a conventional exercise bike given often limited number of adjustments.

It is with these observations in mind, among others, that aspects of the present disclosure were conceived.

BRIEF DESCRIPTION OF THE DRAWINGS

Example embodiments are illustrated in referenced figures of the drawings. It is intended that the embodiments and figures disclosed herein are to be considered illustrative rather than limiting.

FIG. 2A is a side view of a stationary bicycle training device illustrating a various adjustment mechanisms to alter the dimensions of the bicycle device in accordance with one embodiment.

FIG. 2B is a cross-section view of the stationary bicycle training device illustrating a various adjustment mechanisms to alter the dimensions of the bicycle device in accordance with one embodiment.

FIG. 2C is a rear view of a stationary bicycle training device illustrating an adjustment mechanism for forward and/or rearward tilting of a center post in accordance with one embodiment.

DETAILED DESCRIPTION

Figure 1A:
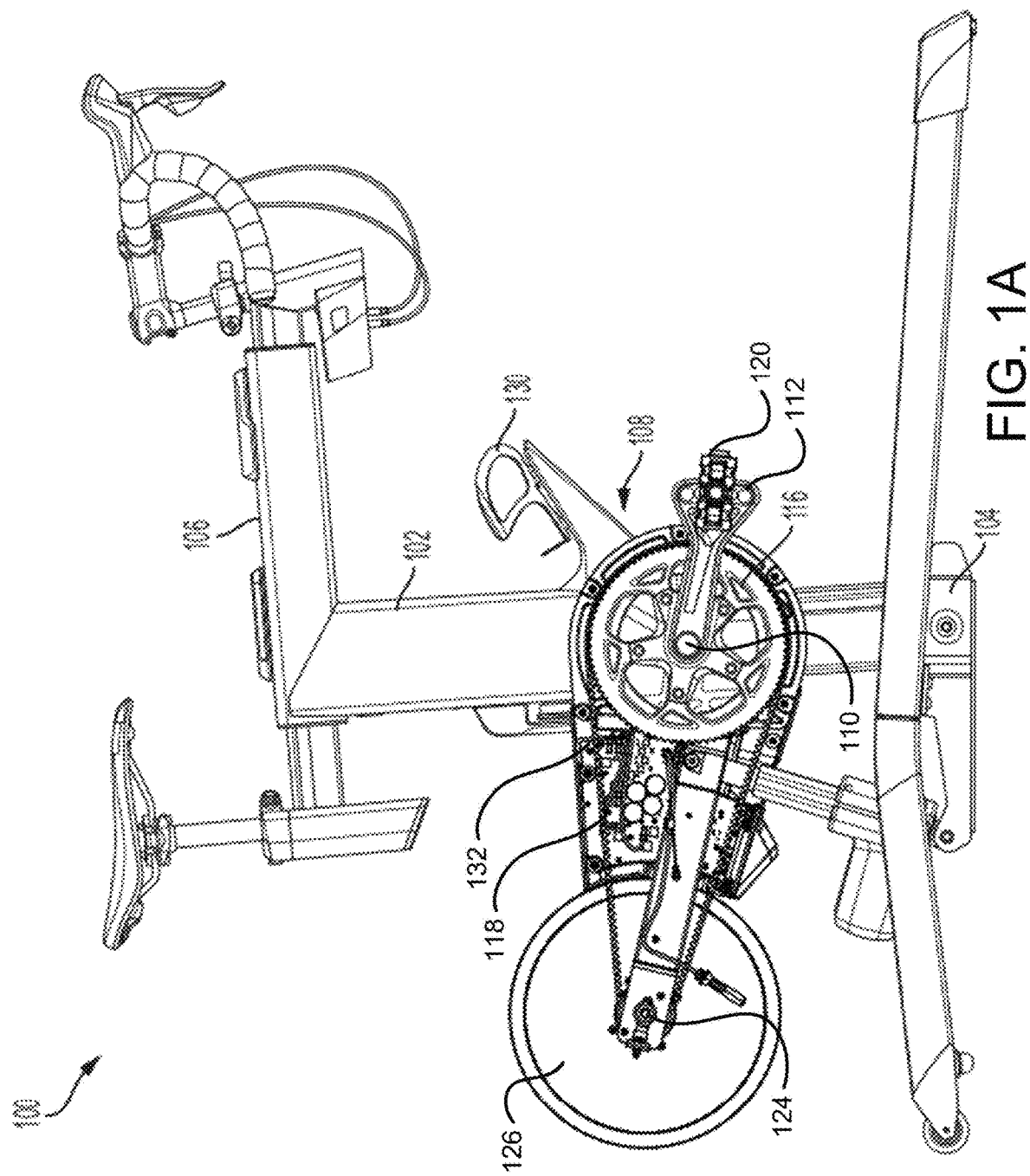
FIG. 1A is a side view of a stationary bicycle training device in accordance with one embodiment.

Aspects of the present disclosure involve a stationary indoor "smart" training bicycle that provides several improvements and advantages over conventional stationary exercise bicycles. In one example, the indoor bicycle provided herein may include adjustable components to provide configurable dimensions to adjust the frame size of the indoor bicycle to properly fit the rider. The number of adjustable dimensions and configuration of the adjustable components provide an exercise bike platform customizable for any rider. For example, a center post may be vertically adjustable to extend the length of the post to various lengths or heights, which has at least the advantage of allowing a rider to adjust the distance between the top tube and the crank axle. A length of a top tube connected to the center post may be also be adjusted. In one example, the top tube length is adjusted through a first horizontally adjustable arm that may be extended rearward from the top tube and a second horizontally adjustable arm that may be extended forward from the top tube, which either or both provide for adjusting the top tube length, the distance between the seat and handlebars, and angular dimensions between the seat, handlebars and/or cranks to further customize the fit of the indoor bike to any given rider. A bicycle seat post may be connected to the rearward adjustable arm and a handlebar post may be connected to the forward adjustable arm, both of which may be adjusted vertically to adjust the seat height and handlebar height. By moving the rearward adjustable arm, the seat position relative to the crank and handlebars are adjusted, as well as the various angles therebetween. Moving the seat rearward also adjusts the seat position angle between the seat and the cranks. Similarly, by moving the forward adjustable arm, the handlebar positon relative to the seat is adjusted, as well as the various angles therebetween. Movement of the first adjustable arm and the second adjustable arm (either forward or rearward in relation to the top tube) allows the rider or user of the stationary bicycle to select a desired length of the top tube and the distance between the seat assembly and the handlebar assembly of the bicycle, as well as the angle between the seat and cranks. Since, the seat height and handlebar height are also adjustable, the angle between the two and hence the rider's overall positioning between the two is thereby adjustable. Thus, the stationary bicycle device provides for vertical adjustment points of the center post, the seat post, and the handlebar post and horizontal adjustment of first adjustable arm (and seat, which may also be adjusted fore and aft on its seat rails) and the second adjustable arm (and handlebars), allowing for the ability to, in essence, define a custom bike frame with custom handlebar, stem and seat arrangements. The multiple points of adjustment of the stationary bicycle device, alone or in combination, allows the bicycle fit to be adjusted to many types, sizes, and shapes of various riders.

Besides the many degrees of frame dimensional adjustment freedom, other advantages provide programmatic ways to translate bicycle fit dimensions between an outdoor (non-stationary) bicycle and the indoor bike, or vice versa. In some implementations, the dimensions of the indoor bicycle may be set or adjusted based on corresponding dimensions of a user's outdoor bicycle. So, if a user has had a professional bike fit, the dimensional relationships of the professional bike fit may be transferred to the indoor bike disclosed herein. For example, the seat height and handle bar height (in relation to the position to any reference point on the bicycle), as well as the distance between the seat and the handlebars, may be determined from the user's outdoor bicycle or professional bike fit and used to adjust the corresponding adjustment points of the indoor bicycle. In this manner, the indoor bicycle may feel similar to the user's outdoor bicycle by adjusting the dimensions of the stationary bicycle to approximate the dimensions of the user's outdoor bicycle, and vice-versa. The seat tube dimensions from the outdoor bike may likewise be used to adjust the center post length. In some instances, angular distances and angles between seat, crank axle and handlebars may be used to define indoor bike adjustments to meet those relationships. In some implementations, one or more of the points of adjustments of the indoor bicycle may be controlled by a controller providing adjustment signals to motors or other mechanical devices to automatically adjust the points of adjustments to determined dimensions.

The determined dimensions of the adjustable indoor stationary bicycle may be provided by a computing device in communication with the stationary bicycle. For example, an application or method embodied in a set of computer executable instructions executed on a computing device, such as a mobile device, may compute and deliver the bicycle dimensions, configurations and/or settings. The computer method may receive one or more inputs that correspond to dimensions of the outdoor bicycle (e.g., receiving key bicycle set-up location and computing angles and separation among and between various points of the outdoor bicycle that can then be translated to the indoor bicycle). The computing device may also translate the determined dimensions of the outdoor bicycle to one or more settings of the adjustment mechanisms of the indoor bicycle to meet or approximate the dimensions of the outdoor bicycle. From the computed settings, some combination of adjustable components may be set to conform to the computed dimensions. The adjustment mechanisms may be manual or controllable or some combination of the same. So, in an exercise bike with one or more controllable adjustment components, a controller of the stationary bicycle may receive the determined configuration settings and automatically adjust the adjustment mechanisms of the stationary bicycle for different riders of the bicycle. Such an auto adjustment version is particularly useful for situations where the exercise bike may be used by more than one rider, such that the bicycle adjusting the dimensions of the bicycle to each rider accordingly. The inputs of the rider's outdoor bicycle may be provided to the application in several ways, including through a manual input of the dimensions in the application via a user interface, via analysis of a digital image of the rider's bicycle, via one or more bike fit result reports transmitted to the application, via measurements of the rider's body or outdoor bicycle, and the like. Through the application, a rider may determine one or more configurations of the dimensions of the stationary bicycle to improve the feel of operating the stationary bicycle for a more comfortable riding experience.

Figure 1B:
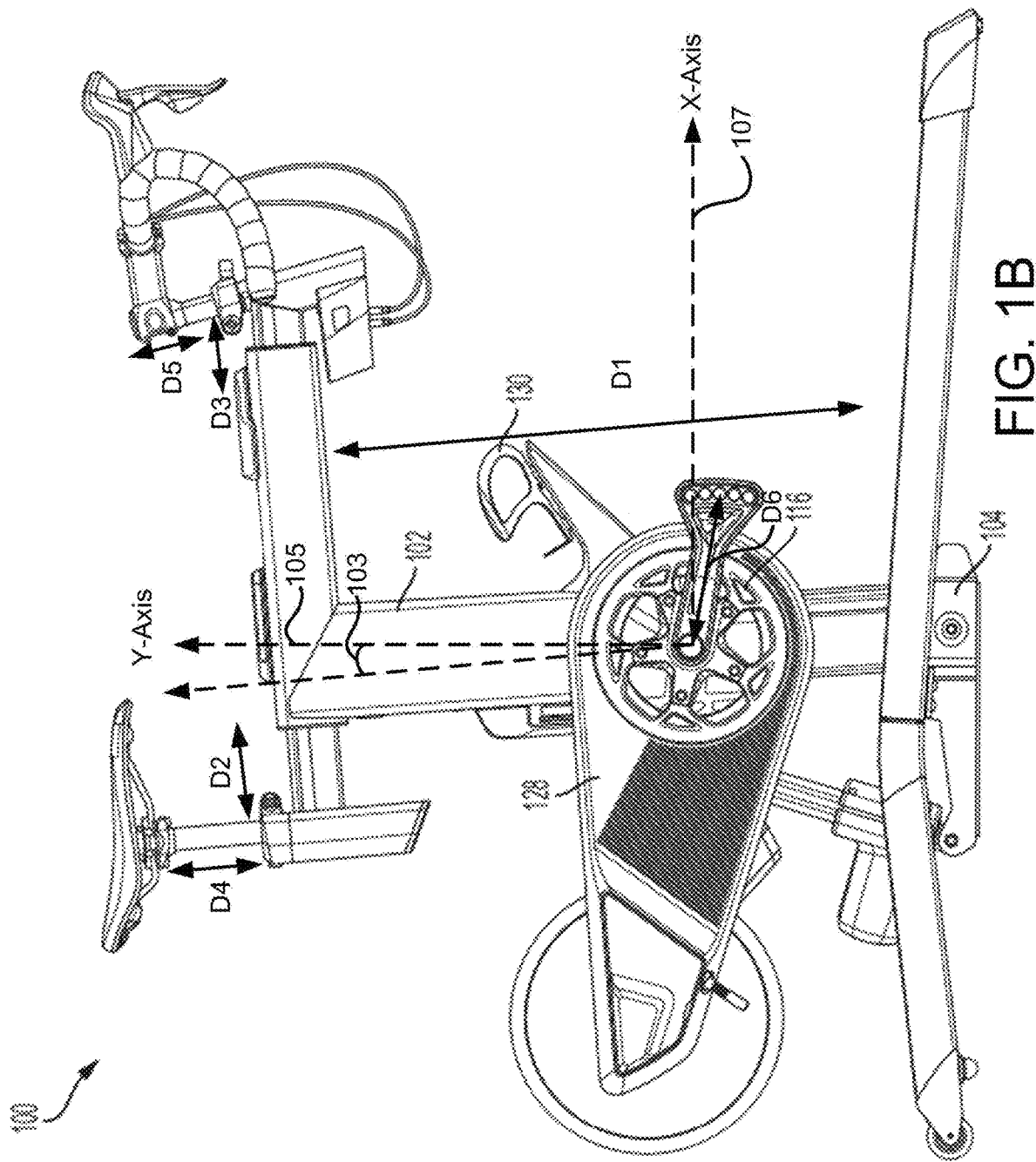
FIG. 1B illustrates the stationary bicycle training device with one or more adjustable dimensions of the bicycle and a reference graph in accordance with one embodiment.

FIG. 1A illustrates an indoor (stationary) bicycle 100 that includes several adjustable mechanisms to alter the dimensions of the stationary bicycle 100. FIG. 1B illustrates the same stationary bicycle 100 with one or more adjustable dimensions (D) of the bicycle and a reference graph for use in discussing the adjustable features of the stationary bicycle below. For example, the stationary bicycle 100 may include an adjustable post 102, which may also be referred to as a seat tube, extending vertically and slightly rearwardly from a foot assembly 104. The adjustable fit dimension D1 may be manipulated through altering the post length, which alters the height of the top tube and alters the distance between the top tube (and seat assembly) and the crank axle 110. A top tube 106 is attached to a top end of the center post 102 opposite the center foot assembly. The neutral position of the center post (the vertical orientation of the post when the indoor cycle is operated in a flat riding orientation (not simulating climbing or descending)) may also be adjusted such that the post is neutrally pivoted more forward or more rearward than shown, which may be used to alter various dimensional relationship and the position of the rider when seated. For example, a center post offset angle 103 (the angle from the vertical y-axis reference and a center line of the center post 102) is illustrated in FIG. 1B. A larger or smaller center post offset angle 103 may be achieved through pivoting of the center post 102 more forward or more rearward than shown. Providing a frame without a down tube, as would be present in many conventional outdoor and exercise bikes where the down tube, conventional rigid seat tube and conventional rigid top tube collectively provide a rigid triangle, the indoor bicycle described herein allows for both adjustment of the center post height (length) and the top tube length as there is not a structural member, like a down tube, fixing the lengths of the center post and the top tube, and the geometry of the frame itself.

Although not related to frame configuration, the center post is also controllably pivotal fore or aft to simulate descending and climbing. In some instances, the top tube 106 may be welded or otherwise connected to the center post 102. The top tube 106 extends forward from the top area of the center post 102. In the example shown, the top tube is also roughly perpendicular the center post but it may define some angle greater or lesser than 90 degrees relative to the center post. Aspects of the center post 102 and the top tube 106 are discussed in more detail below, including mechanisms for adjusting the length of the top tube 106, length of the center tube 102, and other dimensions of the stationary bicycle 100 associated with the top tube 106.

A drive assembly 108 is supported on the center post 102 that may include a drive sprocket 116 connected with a crank axle 110. Crank arms 112 are coupled with the drive sprocket 116 and the crank axle 110. The drive sprocket 116 is configured to turn a belt, but may also be configured for a chain. A first (right) pedal 120 may be connected to the first (right) crank arm 112 and a second (left) pedal may be connected to the second (left) crank arm (See FIG. 2). Pedaling rotates the crank axle 110 and the drive sprocket 116 about a rotation axis through the center of the crank axle 110. The drive sprocket 116 may include teeth extending from the outer circumference of the ring that engage with corresponding treads on an inner surface of a belt drive 118 such that rotation of the drive sprocket 116 causes rotation of the drive belt 118.

The drive belt 118 is also connected to the outer circumference of a rear gear (or sprocket) 124 with a smaller diameter than the drive sprocket 116. The rear gear 124 is located generally rearwardly from the drive sprocket 116 and, similar to the drive sprocket 116, includes teeth extending from the outer circumference surface of the rear gear 124 to engage with corresponding teeth of the drive belt 118. The rear gear 124 is operably engaged with a flywheel/motor assembly 126 such that rotation of the drive belt 118 causes corresponding rotation of the rear gear 124 and, in turn, rotation of the flywheel. In this manner, a rider of the indoor bicycle 100 may pedal the drive assembly 108 to cause rotation of the flywheel/motor assembly 126. In one example, a conventional road bike seat and road bike handlebars are used, and the positioning of the flywheel/motor assembly provides a visual impression of a rear wheel of a conventional bicycle, which combined with conventional handlebars and seat enhances that impression. Exercise bike controls are also integrated into hoods and conventional appearing gear shift controls, again visually enhancing the exercise bike to appear like a road bike. It is nonetheless possible to position the flywheel/motor forwardly and or downwardly relative to the drive assembly, although such positions would not provide the same visual impression for the overall exercise bicycle. In some embodiments, a water bottle cage 130 may extend upward and forward from a front surface of the center post 102.

A control circuit board 132 comprising multiple control components may be supported on a rear surface of the center post 102. Components of the control system for the stationary bicycle 100 discussed further herein may be included in or otherwise supported on the control circuit board 132 for executing one or more drive control programs, sensor signal processing, riding simulation algorithms or programs, and the like. In general, the control circuit board 132 may include components of a computing device, including memory components, processing units or components, electrical signal processing components, and the like for executing one or more programs associated with the operation and control of the stationary bicycle 100.

Returning to adjustable fit dimensions and referring again to FIG. 1B, as noted above, a length of a center post 102 may be extendible to increase the bike dimension along dimension D1. The top tube extends forwardly from the center post. A first horizontally adjustable arm may be extended rearward from the top tube to adjust a rearward distance of a seat assembly from the top tube along dimension D2. This dimensional adjustment, alone or in combination with other adjustments, allows the rider's biomechanical relationship with the handlebars (reach, for example), and cranks (e.g., overall leg length, and thigh length) to be adjusted, among other biomechanical relationships. A second horizontally adjustable arm may be extended forward from the top tube to adjust a forward distance of a handlebar assembly from the top tube along dimension D3. This dimensional adjustment, alone or in combination with other adjustments, allows the rider's biomechanical relationship (e.g., reach and torso angle) to be adjusted, among other biomechanical relationships. A bicycle seat post may be connected to the rearward adjustable arm, which may be adjusted vertically to adjust the seat height along dimension D4. This dimensional adjustment may be used, alone or in combination, to adjust various possible biomechanical relationships including torso angle, knee bend through crank rotation, as well as others. Similarly, a handlebar post may be connected to the forward adjustable arm and adjusted vertically to adjust the handlebar height along dimension D5, again allowing for various biomechanical relationships between the rider and the bicycle to be adjusted. Moving the seat rearward also adjusts the seat position angle between the seat and the cranks. It should be noted that the exercise bicycle may also be fit with an adjustable crank arm 112 allowing the rider to set a crank length D6 without changing cranks arms 112. The adjustment of each of the dimensions illustrated D1-D6 are discussed in more detail below. Further, one or more angles of the stationary bicycle 100 relative to reference graph (y-axis 105 and x-axis 107) may also be adjusted through the adjustment mechanisms of the stationary bicycle 100.

Figure 3:
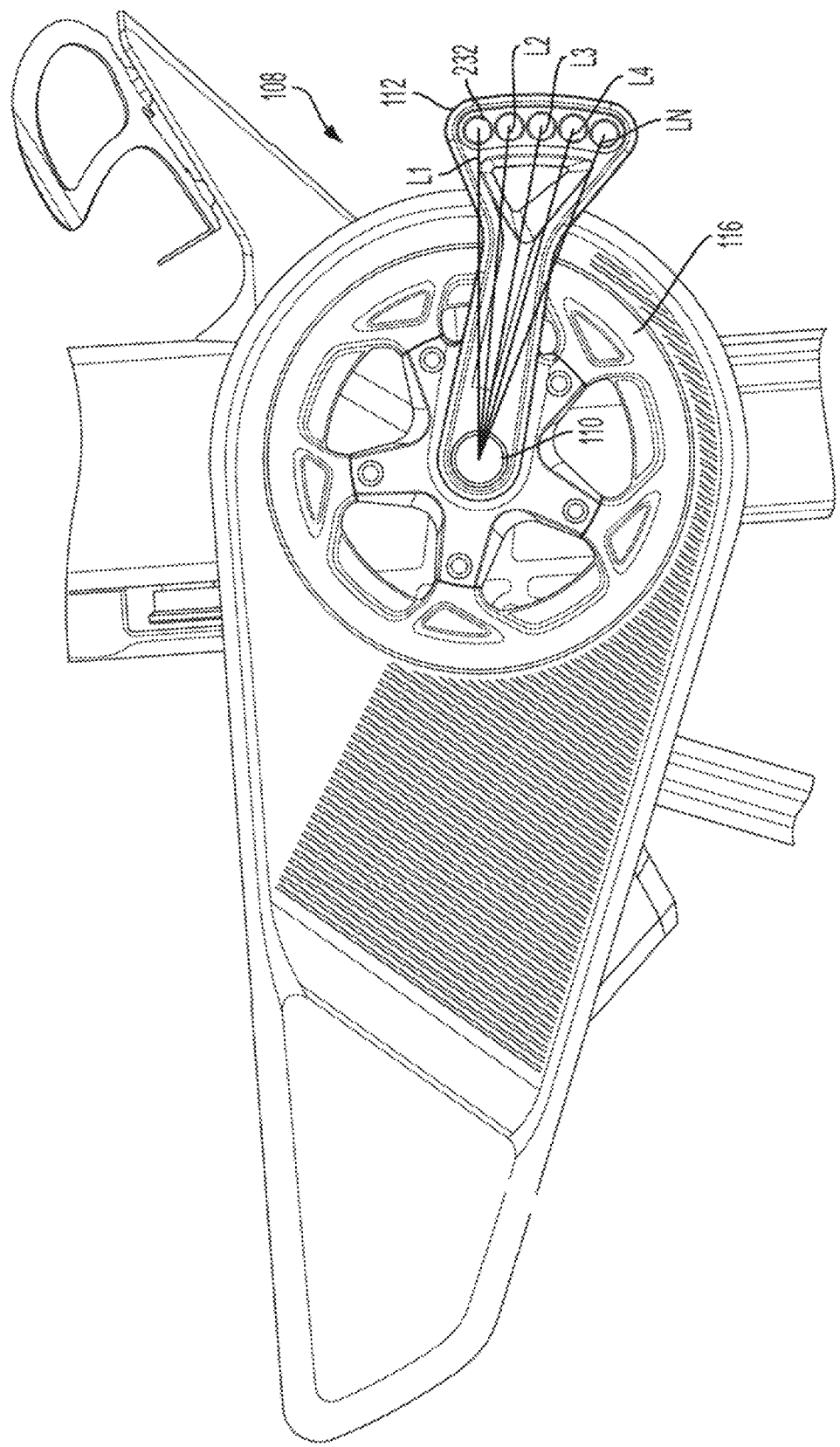
FIG. 3 is a side view of a stationary bicycle training device illustrating an adjustable crank arm in accordance with one embodiment.

FIGS. 2A and 2B illustrate some of the dimensional adjustment mechanisms of the bicycle 100 for adjusting the dimensions or size of the bicycle. In one such adjustment mechanism of the bicycle 100, the center post 102 is configured to be adjustable along dimension D1 to alter the length of the center post 102 and thereby the stack height of the stationary bicycle 100 (e.g., the distance from the center of the drive sprocket 116 to the center of the head tube 176 of the handlebars of the bicycle 100), in addition to the offset angle of the seat assembly 154 and other dimensional angles of the bicycle 100. To adjust the length of the center post 102 and as shown in FIGS. 2-3, the center post 102 may include a hollow outer sleeve 140 that is located around an inner post 142. The outer sleeve 140 may be adjusted vertically along the inner post 142 and locked into position by center post locking mechanism 146. The center post locking mechanism 146, in some instances, may include a spring-loaded locking pin 148 that is coupled to the outer sleeve and engages one of several holes along the vertical length of the inner post 142, although other locking mechanisms to lock the center outer sleeve 140 at a selected height along the inner post 142 may be utilized. To adjust the height of the center post 102, a user of the stationary bicycle 100 may disengage the center post locking mechanism 146 by pulling the locking pin 148 rearward, against a spring force, allowing the outer sleeve 140 to be adjusted along the inner post 142. When a desired center post height is located, the locking pin 148 is reinserted into one of the holes along the inner post 142 to hold the outer sleeve 140 at the selected position. In some implementations, an arm 150 defining a contour over the locking pin is pivotally attached to the outer sleeve 140 at a pivot 149. The arm may be rotated to expose the locking pin and positioned over the locking pin to prevent block access to the locking pin 148 while the stationary bicycle 100 is in use.

In addition to adjustment of the length of the center post 102, the length of the top tube 106 may also be adjusted through two adjustment mechanisms similar to the center post adjustment mechanism. In particular, a rearward horizontally adjustable arm 152 may extend from the rearward end of the top tube 106 to adjust a distance (D2) from the rearward end of the top tube 106 to a seat assembly 154 attached to the rearward end of the adjustable arm 152. This degree D2 of adjustment freedom allows the user body position, relative to the crank axle, handlebars, etc., to be tailored to the individual rider. In some implementations, the distance D2 from the rearward end of the top tube 106 to a seat assembly 154 may be adjusted in a similar manner as the length of the center post 102. For example, the rearward horizontally adjustable arm 152 may include a triangular-shaped cross-section and may be located partially within the top tube 106. A locking mechanism 156, for the rearward adjustable arm, may be included on a top surface of the top tube 106 and includes a screw mechanism that, when rotated into a locking position, extends downward into the top tube 106 and applies a locking force on a top surface of the adjustable arm 152 to hold the arm in place at the desired extension length. Rotation of the locking mechanism into an unlocked position releases the downward force on the adjustable arm 152 such that the arm may be extended or retracted. The seat assembly 154 may be connected to the rearward horizontally adjustable arm 152 at a distal end of the arm from the top tube 106 such that horizontal adjustment of the rearward horizontally adjustable arm 152 increases a distance of the seat from the top tube 106 end. A rider may thus adjust the distance of the seat assembly 154 relative to the top tube 106 by disengaging the rearward adjustable arm locking mechanism 156, sliding the rearward horizontally adjustable arm 152 into or out of the top tube 106, and re-engaging the rearward adjustable arm locking mechanism 156 at the desired distance. In addition, adjustment of the rearward horizontally adjustable arm 152 may increase or decrease the seat angle (e.g., the angle from center of the drive sprocket 116 to the center of the seat assembly 154) for the rider.

In addition, the seat assembly 154 may include a seat height adjustment mechanism to adjust the height of the seat 164. In particular, the seat assembly 154 may include a seat post 162 extending from a seat tube 168 attached to a rearward end of the rearward horizontally adjustable arm 152. The seat post 162 may extend partially vertically between seat tube 168 and the bike seat 164 and the height or length of the seat post 162 that extends above the seat tube 168 may be adjusted through a seat locking mechanism 170. The seat itself may also be adjusted fore and aft relative to the top of the seat post using a rail and clamp mechanism.

A forward horizontally adjustable arm 158 may also extend from the front end of the top tube 106 to adjust a distance (D3) from the front end of the top tube 106 to a handlebar assembly 160 attached to the front end of the adjustable arm 158. Changes to the length D3 from the top tube 106 to the handlebar assembly 160 may be adjusted in a similar manner as described above. In particular, the forward horizontally adjustable arm 158 may include a triangular-shaped bar located within a front opening of the top tube 106. A forward adjustable arm locking mechanism 166 may be included on the top surface of the top tube 106 that includes a rotatable locking mechanism that engages with a top surface of the forward horizontally adjustable arm 158 to hold or lock the arm in place at the desired extension length. A handlebar assembly 160 may be connected to the forward horizontally adjustable arm 158 at a distal end of the arm from the top tube 106 such that adjustment of the forward horizontally adjustable arm 158 increases a distance of the handlebar assembly 160 from the top tube 106 end. The handlebar assembly 160 may include handlebars 172, brake and shifter controllers 174, a handlebar post 176, and a head tube 178. The handlebar post 176 may extend between head tube 178 and the handlebars 172 and may be adjustable to vary the height of the handlebars 172. In particular, the height or length of the handlebar post 176 that extends above the head tube 178 may be adjusted through a handlebar locking mechanism 180. A rider or user of the stationary bicycle 100 may adjust the distance of the handlebar assembly 160 from the top tube 106 (and the center post 102 and seat assembly 154) by disengaging the forward adjustable arm locking mechanism 166, sliding the forward horizontally adjustable arm 158 into or out of the top tube 106, and re-engaging the rearward adjustable arm locking mechanism 166 at the desired distance. Forward adjustable arm locking mechanism 166 may operate in a similar manner as locking mechanism 156 described above.

Another adjustment mechanism of the stationary bicycle 100 is illustrated in FIG. 2C and may include a forward and/or rearward tilting of the center post 102. The tilting of the center post 102 may be controlled through a tilting mechanism 202 connected to the lower end of the center post 102 and a center foot assembly 210. The center post may be rotatably mounted to the center foot assembly 210 near the bottom end of the center post 102. The tilting mechanism 202 may involve a motor driven post 206 that extends or retracts to pivot the center post 102. In one example, the tilting mechanism is a linear actuator, preferably mechanical but pneumatic or hydraulic are also possible or any other motor that drives the post. More particularly, the tilting mechanism 202 may be rotatably supported at the rearward end of the foot assembly 210. In one example, the rotatable support is achieved through a tilting drive mounting pin 212 extending through the side walls of the center foot assembly 104 and through a pair of mounting loops 214 extending from the bottom of a tilting drive motor 204. The tilting mechanism 202 is allowed to pivot or rotate around the tilting drive mounting pin 212 forwardly or rearwardly. Other rotatable connections between the tilting mechanism 202 and the center foot assembly 210 are possible. The tilting drive motor 204 may include a stepper motor drive to extend or retract a shaft 206 connected at a lower end to the tilting drive 204 and at an upper end to the center post 102.

To tilt (pivot) the post 102 and alter the top tube offset angle 103, the tilting drive 204 extends or retracts the shaft 206. Extension of the shaft 206 tilts the center post 102 forward and alters the top tube angle in a clockwise direction (from the perspective illustrated in FIG. 1B). Retraction of the shaft 206 by the tilting drive 204 generates an opposite tilting movement of the center post 102 rearward and alters the top tube angle in a counter-clockwise direction (also relative to FIG. 1B). In this manner and through the control of the tilting mechanism 202, the angle of the center post 102 and subsequently the top tube 103 from the reference vertical Y-axis 105 may be adjusted to provide alternate top tube offset angles to approximate a corresponding top tube angle for a user's reference bicycle, as explained in more detail below.

Other tilting mechanisms may be also or alternatively be included on the stationary bicycle 100. For example, the tilt drive 204 may include any type of actuator to extend or retract the tilt shaft 206, such as a piston mechanism, stepper motor, screw drive, or any other mechanical device that actuates the extension and retraction of the shaft. Further, the tilt drive 204 may be located in various locations on the stationary bicycle 100, such as at the upper end of the center post 102, in front of the center post, adjacent to center post, etc. In still other instances, the tilting mechanism 202 may not include a tilt shaft but may instead rotate the center post 102 in response to the drive signals. For example, a rotational drive may be in communication with the center post 102 to rotate the center post in a forward or backward rotation.

Additional features of the stationary bicycle 100 may also include an adjustable crank arm 112 that is configurable to provide different effective crank lengths D6, as shown in FIG. 3. The crank arm 112 may have a generally hammer shape, with the crank arm terminating in an enlarged head, and be connected to the crank shaft 110 on a first end such that the entire crank arm 112 is rotatable about the crank shaft. At the enlarged head, there are a plurality of threaded holes 232. The enlarged head is at an end distal to the end of the crank arm 112 connected to the crank shaft 110. The threaded holes 232 may be disposed in an arcuate arrangement along the end of the crank arm 112, where each hole defines a different distance (L1-LN) to the crank axle 110 such that whichever hole a pedal 120 is mounted defines a different effective crank length D6. More particularly, the threads of each crank arm hole 232 may engage corresponding threads on a mounting rod (spindle) of a pedal 120 such that the pedal screwed onto or otherwise connected to the crank arm 112 at any of the crank arm hole 232 positions. By threadably engaging a pedal 120 with one of the plurality of threaded holes 232 of the crank arm 112, the crank length (or the length from the center of the crank shaft 110 to the center of the pedal 120) may be adjusted as desired by a rider of the stationary bicycle 100. For example, the length L1 from the center of the crank shaft 110 to the center of a first hole may be shorter than a length L2 from the center of the crank shaft 110 to the center of a second hole of the crank arm. The crank arm 112 may include multiple such lengths such that, by selecting to insert the pedal 120 into one of the holes, a user of the stationary bicycle 100 may select the desired length D6 (corresponding to one or length L1 through LN) for the rider's fit. The adjustment of the crank length further customizes the stationary bicycle 100 to a rider's preferences or dimensions.

Figure 4:
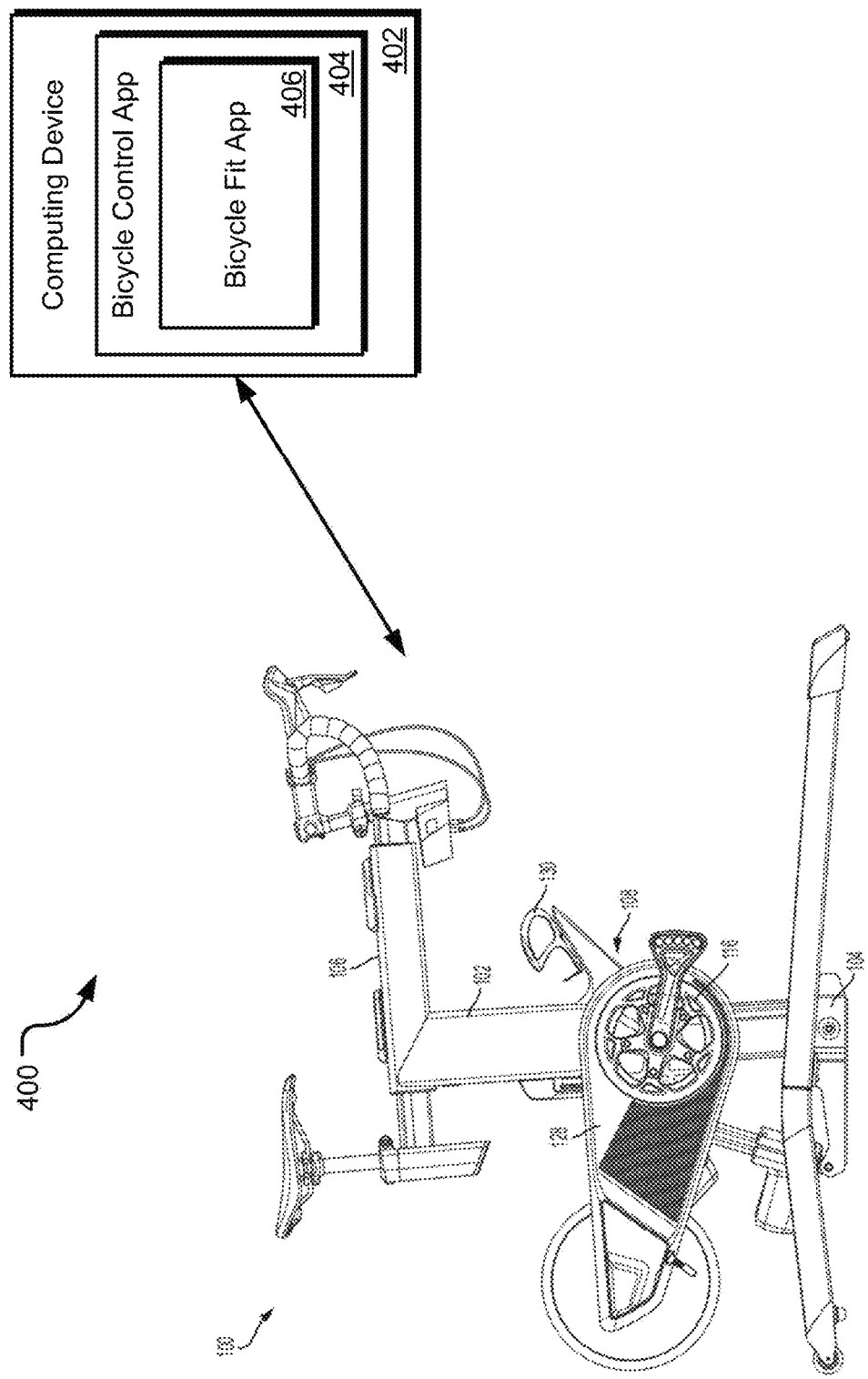
FIG. 4 is a schematic illustration of a system for adjusting the dimensions of the configurable stationary bicycle in accordance with one embodiment.

Through the adjustments mechanisms described above, the stationary bicycle 100 provides for vertical adjustment of the center post 102, the seat post 162, and the handlebar post 176 and horizontal adjustment of forward horizontally adjustable arm 158 and the rearward horizontally adjustable arm 152, in addition to other adjustment mechanisms (such as handlebar stem length, seat position, etc.). These multiple dimensions of adjustment of the stationary bicycle 100 allow the bicycle to be adjusted or customized to many types, sizes, and shapes of various riders of the stationary bicycle 100. In some instances, the dimensions of the stationary bicycle 100 may be selected or determined so as to approximate the dimensions and/or feel of the rider's outdoor bicycle. Further, in some embodiments, the various settings or adjustments made to the adjustment mechanisms of the stationary bicycle 100 may be determined and provided to a user of the bicycle through a program or application. For example, FIG. 4 is a schematic illustration of a system 400 for adjusting the dimensions of the configurable stationary bicycle 100 in accordance with one embodiment. In general, the system 400 may include a stationary bicycle 100, such as that described above, and a computing device 402 in communication with the stationary bicycle. The bicycle 100 and the computing device 402 may communicate through a wired or wireless connection or other communication scheme. For example, the stationary bicycle 100 may include a communication module 182 to transmit and receive wireless communications with the computing device 402. Thus, communication module 182 may include a wireless transmitter/receiver. In another embodiment, the computing device may be plugged into or otherwise connect to a port or other communication interface. Further, in one particular example, the computing device 402 may be a mobile computing device, such as a smart phone or other computerized personal assistant device to wirelessly communicate with the communication module 182 of the stationary bicycle 100. Although discussed herein as a mobile device or computing device, the computing device 402 of the system 400 may be any type of computer, including a laptop computer, a desktop computers, a tablet device, and the like.

In some embodiments, the mobile device 402 may execute one or more applications associated with the stationary bicycle 100. In particular, a bicycle control application 404 may be stored on and executed by the mobile device 402 to provide various interactivities with the stationary bicycle 100. Thus, the bicycle control application 404 may include one or more sub-applications from a suite of bicycle applications for a user to interact with the stationary bicycle 100. One such sub-application may be a bicycle fit application 406. The bicycle fit application 406 may be configured to provide one or more configuration settings of the stationary bicycle 100 based on inputs received via the computing device. In one example, the bicycle fit application 406 may receive dimensions of a user's road bicycle, dimensions of a user's body, one or more digital images of a user's bicycle, one or more bicycle fit reports from a third party, etc. and determine one or more settings of the adjustment mechanisms of the stationary bicycle 100 according to the received inputs. The bicycle fit application 406 may provide configuration settings to a user, or automatically adjust the dimensions of the stationary bicycle 100, according to inputs received from a user of the application 406. It is also possible for the fit application to receive various dimensions of the exercise bike, and provide information or translation to dimensions of a free cycle.

Figure 5:
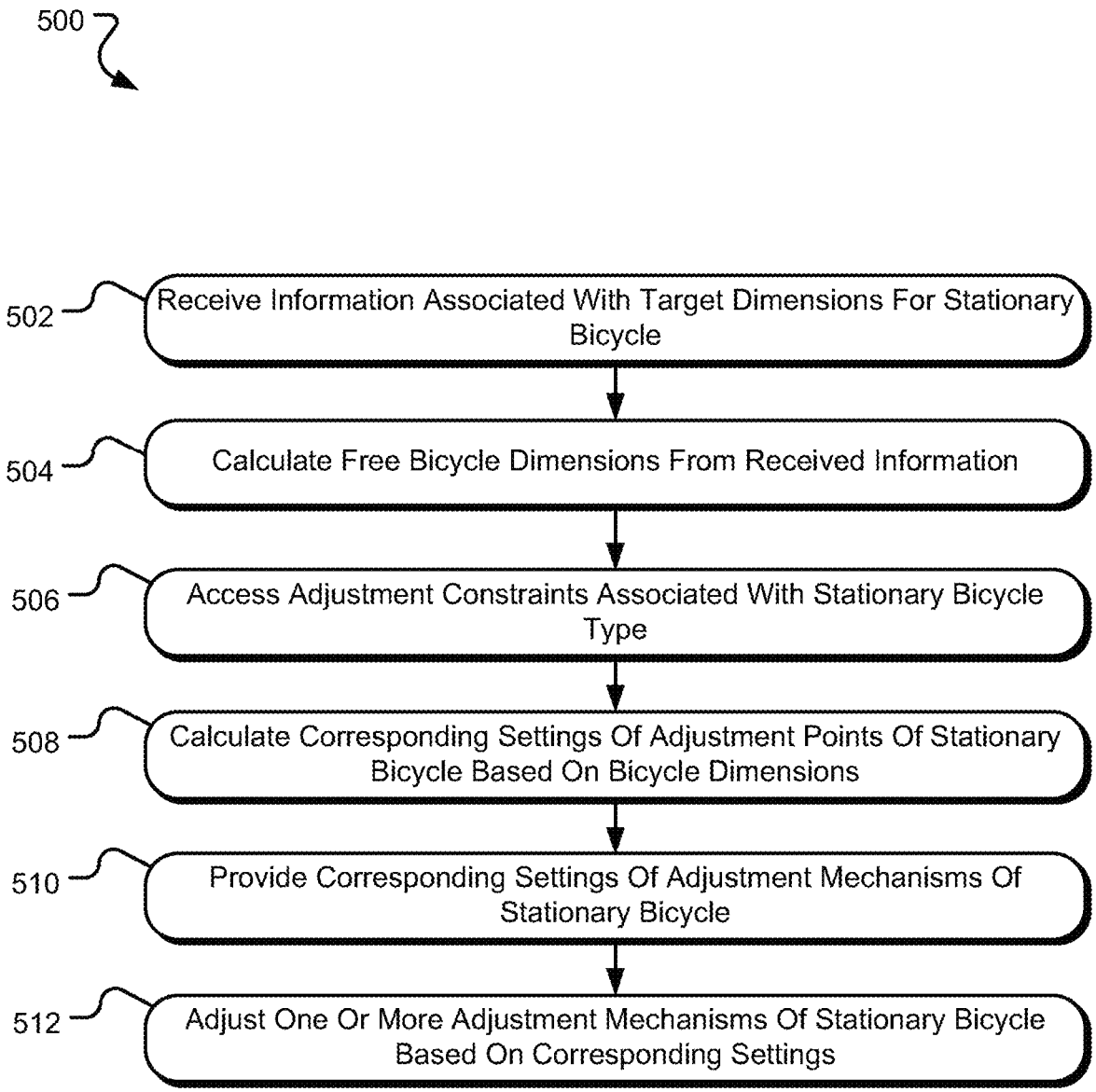
FIG. 5 is a flowchart illustrating a method for providing one or more dimensional configuration settings of a stationary bicycle training device in accordance with one embodiment.

FIG. 5 is a flowchart illustrating a method 500 for determining one or more dimensional configuration settings of the stationary bicycle device 100 in accordance with one embodiment. In some instances, the bicycle fit application 406 executed on the computing device 402 may perform one or more of the operations of the method 500 to determine stationary bicycle 100 settings. Other applications executed on the computing device 402 or other computing devices may execute one or more of the operations of the method 500, including a computing device of the stationary bicycle 100, such as communication module 182. Through the method 500, one or more settings of the stationary bicycle 100 may be determined or generated in response to inputs provided to the application 406 corresponding to a user's bicycle or body frame.

Beginning in operation 502, the bicycle fit application 406 may receive information associated with the dimensions of a user's bicycle or one or more dimensions of the user's body. For example, a user may provide one or more professional bicycle fit reports generated by a third party. The fit report may include dimensions or measurements associated with a bicycle. Generally speaking, such a report may be based on the user's body dimensions, comfort goals, bicycle type and dimensions, etc. For example, the fit report may include a stack height value (vertical distance from the bottom of a crank assembly of a bicycle to the center point of a bicycle head tube), reach value (horizontal distance from the bottom of the crank assembly of the bicycle to the center point of the head tube), seat setback angle (angle of bicycle seat from vertical line from center of crank assembly), and the like. A user may input one or more values from the report or reports into a user interface of the application 406 executed/displayed on the computing device 402. In another example, a digital version of the report or reports may be downloaded to the application and one or more values of the fit report may be obtained by the application 406 for use in generating bicycle dimension settings, as explained in more detail below.

In another example, a user may manually input one or more dimensions of the user's outdoor bicycle to approximate the feel of riding the outdoor bicycle while using the stationary bicycle. For example, a user may measure dimensions of the outdoor bicycle, such as stack height, handlebar reach distance, seat setback angle, vertical distance between the seat height and handlebar height, and the like. The user may input these measurements into the application 406 via the user interface of the application 402. In some instances, the application 402 may display one or more requests for particular dimension measurements of the user's outdoor bicycle and provide a portion of the user interface in which the user enters the requested measurements. In another example, the user may provide one or more measurements of the user's body, such as the user's weight, height, wingspan, etc. Similar to the outdoor bicycle measurements, the application 406 may request, via the user interface, the body type measurements of the user and provide an interface in which such measurement values may be provided to the application.

Figure 6:
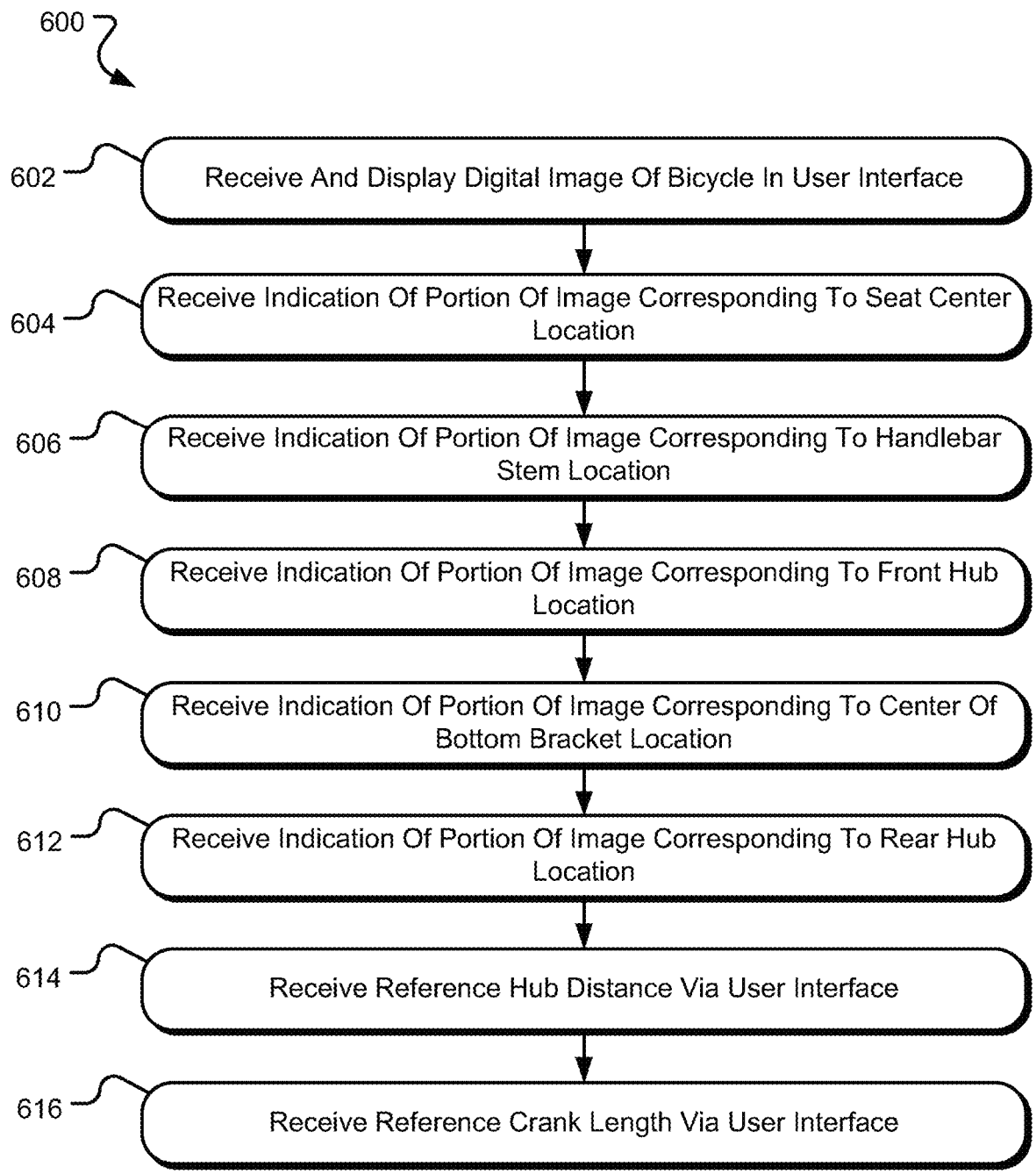
FIG. 6 is a flowchart illustrating a method for obtaining references within a digital image via a user interface associated with a stationary bicycle device in accordance with one embodiment.

In still another example, the application 406 may receive the information associated with the user's outdoor bicycle via a digital image of the user's bicycle. In particular, FIG. 6 is a flowchart of a method 600 for obtaining references, within the digital image, associated with the bicycle device (e.g., operation 502). The operations of the method 600 may be performed or executed by the fit application 406 or other application of the computing device 402. Through the method 600, the application 406 may receive various references within the digital image of a user's outdoor bicycle (or other bicycle) from which one or more settings or adjustments to the dimensions of the stationary bicycle 100 described herein may be determined or calculated. More or fewer of the operations of the method 600 may be included in other implementations of the application 406.

Beginning in operation 602, the application 406 may receive or otherwise obtain a digital image of a reference bicycle. In some instances, the application 406 may access another application of the computing device 402 to receive the digital image, such as an image repository of the computing device 402 associated with a digital camera device. In one particular example, a user of the computing device 402 may utilize the camera of the computing device to take a digital image of the user's bicycle, which may be stored in a storage device of the computing device. The application 406, in response to instructions provided by the user of the computing device 402, may obtain the digital image from the repository and display the image in the user interface associated with the application 402. In another implementation, the application 406 may be given access to the camera device of the computing device 402 through which the digital image of the bicycle may be obtained. Regardless of how the digital image of the bicycle is obtained, the application 406 may receive the image and display, in some instances, the digital image on the display device of the computing device 402.

In addition to displaying the digital image, the application 406 may also display one or more instructions to the user of the computing device 402 to provide reference points or locations within the digital image corresponding to components or locations of the pictured bicycle. For example, FIGS. 7A-7H illustrate a plurality of user interfaces 702-716, which may be also considered and encompass a sequence of operations for conducting the fit/dimension adjustment, associated with the application 406 instructing a user to provide particular measurements and identifying locations of the user's bicycle within the digital image. The user interfaces 702-716 represent portions of a user interface displayed on the computing device 402 executing the bicycle fit application 406. Through the user interfaces 702-716, the application 406 may obtain or determine one or more dimensions of a user's bicycle from which the application may determine adjustment settings of the stationary bicycle 100. It should be noted that the application may directly compute various settings, or the various reference points, digital image, and/or measurements, may be uploaded to an application running remotely, such as at a server, which may return results for the application to display at the computing device. The user interfaces 702-716 provide an example of some of the operations of the method 600 of FIG. 6. In particular, once the digital image is displayed in the user interface as shown in user interface 702 of FIG. 7A, the application 406 may, through the user interface 702, provide a sequence of instructions and inputs to identify reference points of the bicycle and dimensions, from which the application may compute adjustment settings for the exercise bike.

Generally speaking, one aspect of the application involves identifying key locations on the bicycle image (e.g., seat, handlebar stem, crank axle) from which dimensional relationships (distance and angles) between the locations may be computed with knowledge of the scale of the image. To begin, in FIG. 7A, a first user interface 702 is provided whereby a seat location within the digital image is identified. In the example shown, a graphic 703 of a seat is illustrated with a crosshair on an upper portion of the seat. The graphic illustrates the location within the digital image where the crosshair should be placed. The user interface 702 includes instructions to the user to place the crosshair on the image of the bicycle in the same location as shown in the graphic. In one example, such as with a smart phone have any touch or stylus sensitive screen, the user may input an estimated location within the image of the seat by placing a finger or stylus on the display device within the user interface 702. In response and as shown in the user interface 704 of FIG. 7B, the application displays a zoomed image area 718 with a crosshair within the zoom area to aid the user in placing the crosshair image in the position shown in the graphic 703. The zoomed portion 718 may be dragged across the image as the user moves their finger or stylus within the image, and when the crosshair is positioned over the appropriate location in the image, released to place the crosshair. The user interface 704 may interpret the placement of the crosshair within the image as the location of the requested bicycle portion within the image. For example, the application 406 may receive the indication within the digital image corresponding to the crosshair as a requested input, such as the location of a portion of the image that corresponds to a seat top center location of the bicycle. In other words, because the crosshair was placed within the digital image in the user interface 704, in response to the request, the application may correlate the crosshair with the seat location.

Other methods and devices for providing an input to a computing device 402 may also be used to manipulate the crosshair icon to the indicated position within the image of the bicycle. For example, through image recognition, the application may automatically place crosshairs at the various locations, and the application request confirmation by the user. The application may also provide the ability to touch the screen to adjust the location of the crosshair to correct any issues with the automatic placement.

Figure 8:
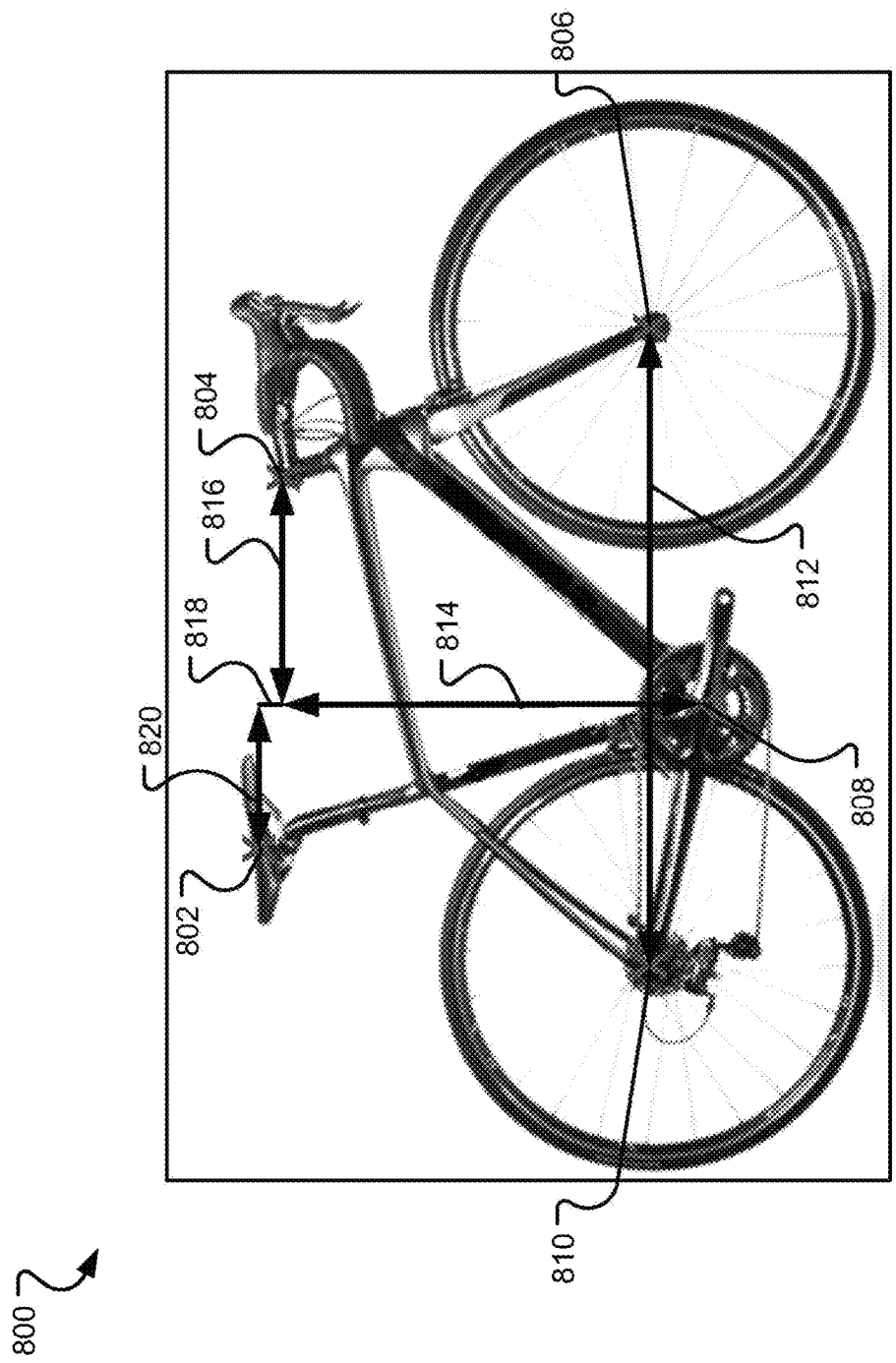
FIG. 8 illustrates an example digital image of a bicycle with various locations within the image corresponding to portion of the imaged bicycle in accordance with one embodiment.

An example digital image 800 is illustrated in FIG. 8 that includes a reference bicycle with various locations within the image corresponding to portion of the reference bicycle. The digital image 800 may include thousands to millions of pixels, with the color of the individual pixels defining the picture presented by the digital image 800. The individual pixels of the image 800 are not illustrated in FIG. 8 for clarity. However, the pixels of the image 800 may provide a grid within the image 800 from which locations within the image may be determined. Through the user interface of the bicycle fit application 406, a user of the application may indicate locations within the digital image 800 corresponding to components or locations of the pictured bicycle. For example and as described above, the user may be instructed and provide an indication within the image 800 of the center of the seat of the pictured bicycle. More particularly, the user may use an input device of the computing device 402 on which the digital image 800 is displayed to indicate the requested location. In the example shown in FIG. 8, location 802 may be input to the application 406 to indicate the location of the center of the seat. Thus, in operation 604 of the method 600 of FIG. 6, the application 406 may receive an indication of the portion of the image 800 corresponding to the seat center location of the pictured bicycle. In some instances, the application 406 may associate one or more pixels of the digital image 800 corresponding to the seat center location within the image 800.

Additional points within the digital image 800 may also be requested via the user interface. For example, the user interface 706 (FIG. 7C) provides for identifying a point on the handlebar stem. The user interface provides a graphic of the handlebar and stem along with a location as to where to place the crosshair on the image. A user may place the crosshair using the same technique as discussed relative to FIG. 7B. In operation 606, the application 606 may receive the indication of the portion of the image 800 corresponding to the handlebar stem location and store the indicated location. An example location within the digital image 800 of the handlebar stem is indicated in FIG. 8 as location 804. Similarly, the user interface of FIG. 7D may be used for identifying the location of the center of the front wheel axle (front hub). Within this same user interface or otherwise, a request for wheel size may also be requested (e.g., 26 inch, 27.5 inch, 29 inch, etc.). In operation 608 of the method 600, the application 406 may thus receive the corresponding location of the front hub within the digital image 800, also illustrated in the digital image 800 of FIG. 8 at location 806.

Figure 7A:
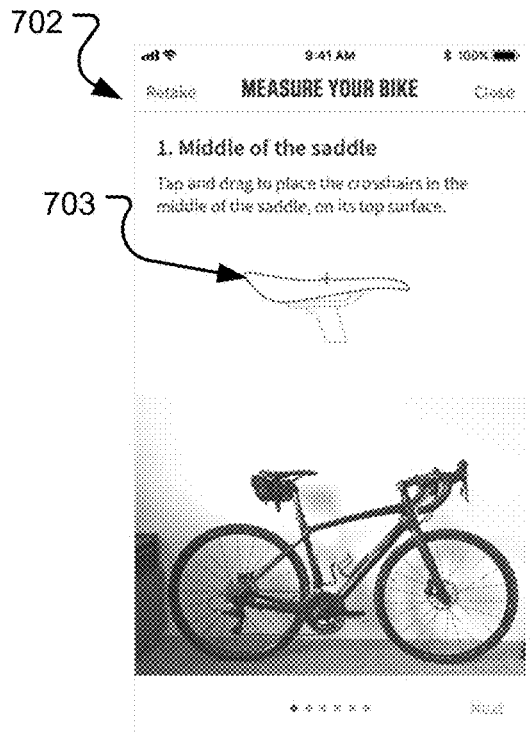
FIGS. 7A-7H illustrate a plurality of user interfaces of a user interface associated with the application instructing a user to provide particular measurements of the user's bicycle within a digital image of the user's bicycle in accordance with one embodiment.
Figure 7B:
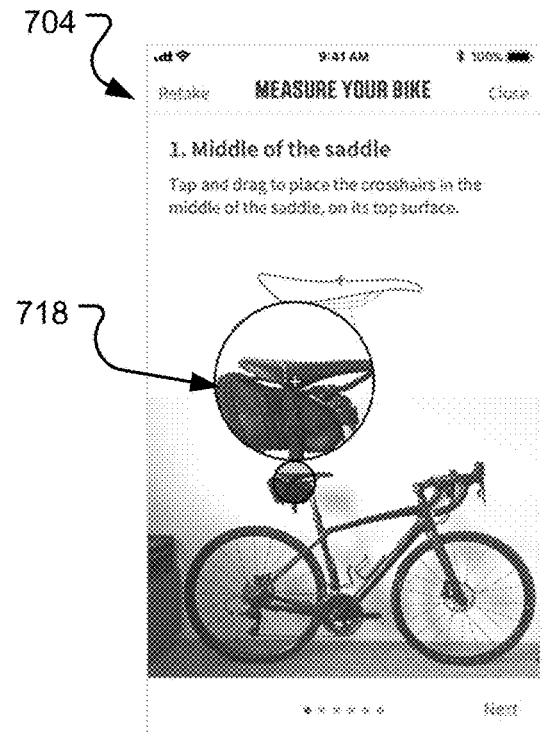
Figure 7C:
Figure 7D:
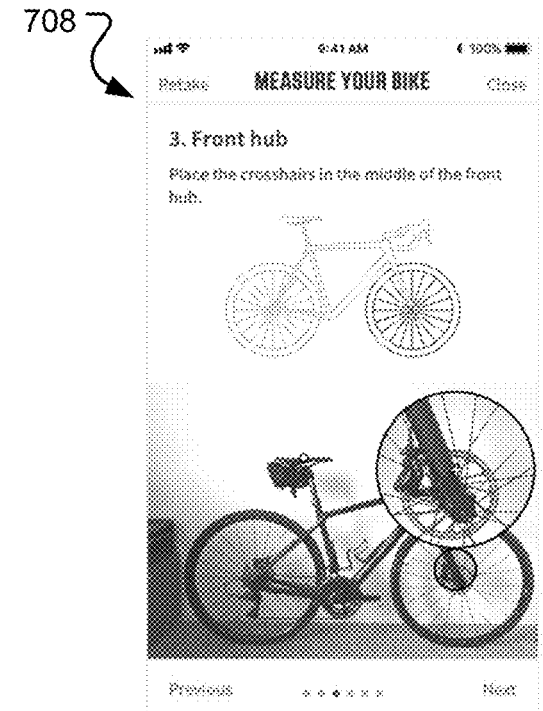
Figure 7E:
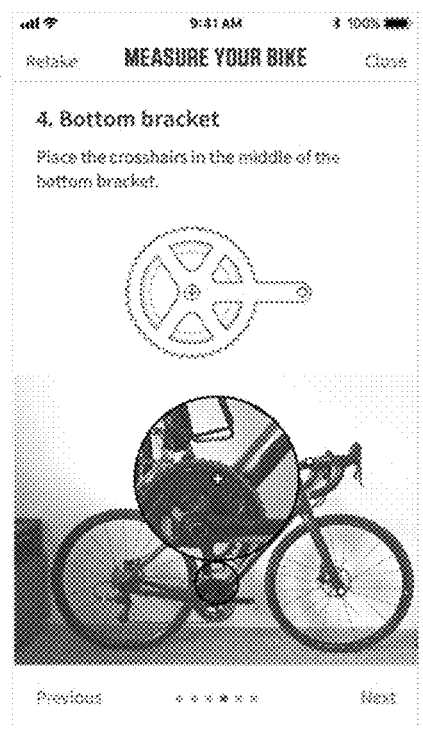
Figure 7F:
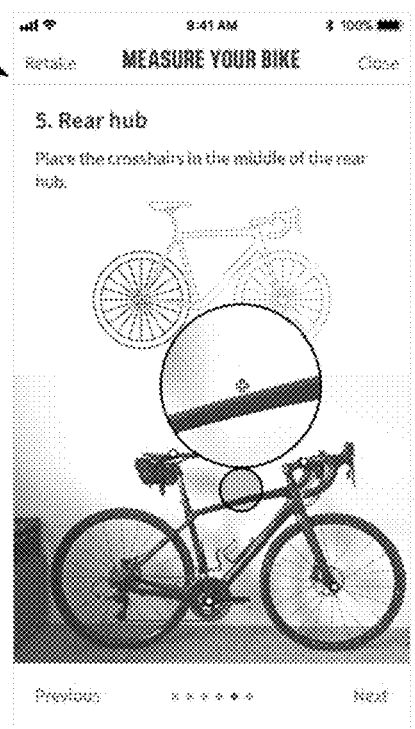

FIG. 7E is a user interface providing a way to identify the center of the bottom bracket (which is also the crank axle). In operation 610, the application 406 may receive the indication of the digital image 800 (illustrated in FIG. 8 as location 808) corresponding to the bottom bracket via the user interface 710. The user interface 712 shown in FIG. 7F is for identifying the rear wheel axle (center of the rear hub). In operation 612, the application 406 may receive the indication of the digital image 800 (illustrated in FIG. 8 as location 810) corresponding to the rear hub via the user interface 712. More or fewer positions within the digital image corresponding to the illustrated bicycle may be requested by the application 406. Some measurements, however, may not be necessary. For example, the top tube length of the actual bicycle may not be needed as the exercise bicycle may be set up to position the seat and handlebar, for example, in the same relative location as the actual measured bicycle but with a different top tube length as the overall adjustments may be made through combinations of adjustments.

Figure 7G:
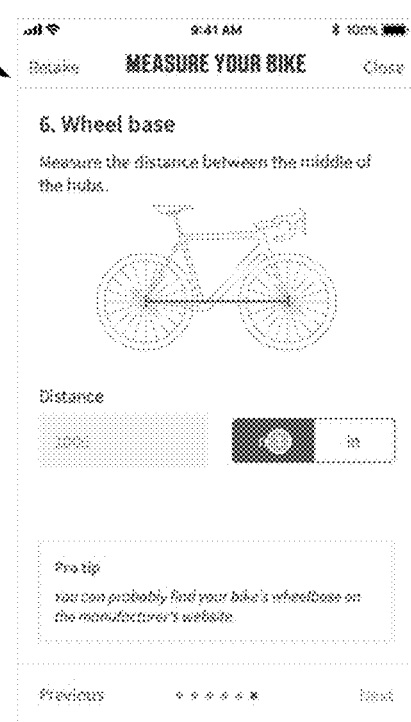
Figure 7H:
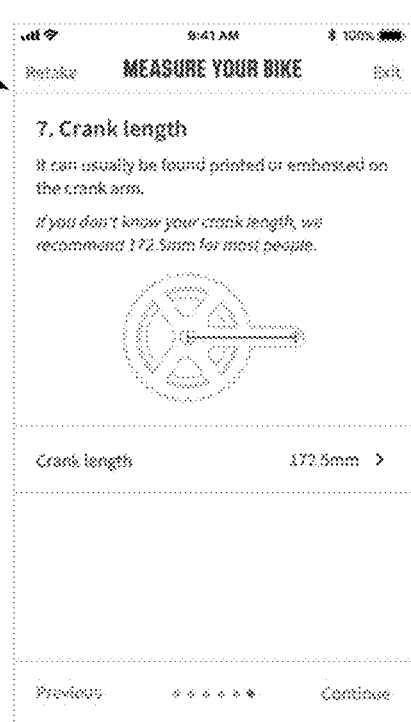

In addition, the application 406 may receive one or more distances or measurements of the user's bicycle. For example, user interface 714 of FIG. 7G provides for the input of the distance between the middle of the hubs of the user's bicycle such that the application 406 may receive a reference hub distance via the user interface 714 in operation 614. In some instances, the application 406 may utilize a measurement application of the computing device 402 to scan the image and provide the requested distance. In other instances, the user may measure the requested distance and provide the measurement to the application 406 via the user interface 714. User interface 716 of FIG. 7H is an example user interface of the application 406 through which a crank arm length of the pictured bicycle may be provided. The application 406 may thus receive the reference bicycle crank length in operation 616, such as via user interface 716. Through the locations 802-810 indicated within the digital image 800 and/or the provided reference lengths, the application 406 may calculate one or more estimated dimensions of the user's bicycle for use in determining the corresponding adjustments or settings of the stationary bicycle to approximate the user's bicycle dimensions.

Figure 9:
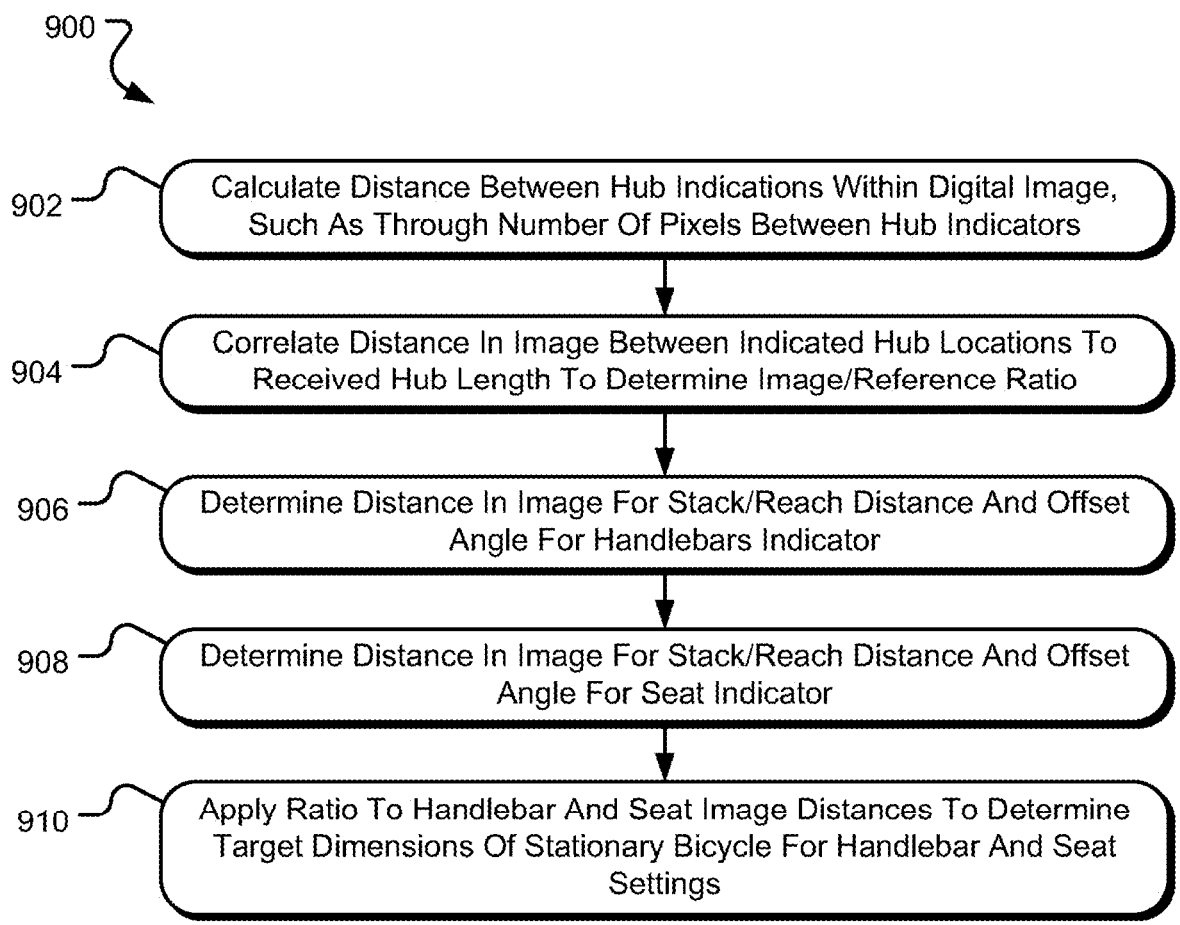
FIG. 9 is a flowchart illustrating a method for obtaining a reference ratio for determining a corresponding length in a digital image to a reference length in accordance with one embodiment.

Returning to the method 500 of FIG. 5, the application 406 may calculate, in operation 504, one or more dimensions of the user's outdoor bicycle from the received information obtained via the user interface. For example, the computing device may calculate one or more of the above dimensions of the outdoor bicycle using the information inputted through the user interfaces and/or through an analysis of the bicycle image. For example, FIG. 9 is a method 900 for the application 406 to determine, calculate, or estimate one or more dimensions of the reference bicycle based on the reference locations and/or lengths provided above via the user interface of the application 406. As such, one or more of the operations of the method 900 may be performed by the application 406 or other components of the computing device 402.

Beginning in operation 902, the application 406 may calculate or determine a distance within the digital image 800 between the indications of the front hub and the rear hub. Using the digital image 800 example of FIG. 8, the application 406 may determine the distance within the image between the indication point 810 (corresponding to the rear hub) and the indication point 806 (corresponding to the front hub). The distance in the image 800 is indicated in FIG. 8 as length 812. In some instances, the distance within the image 800 may be determined by calculating a number of pixels of the image 800 between the indicated points. For example, the application 406 may determine a first relative pixel location within the grid of pixels of the image 800 for indicated location 810 and a second relative pixel location within the grid of pixels of the image 800 for indicated location 806. With the relative pixel grid locations, the application 406 may determine the distance between the indicated locations 806,810 by calculating a line 812 on the grid of pixels connecting the locations and determining a length of the line 812. In another instance, the application 406 may estimate the length of line 812 based on a size of the image 800 and the location of indicated points 806,810 within the image 800.

In operation 904, the application 406 may correlate the determined distance or length 812 in the image 800 between the indicated location 810 of the rear hub and the indicated location 806 of the front hub to the received hub distance of the reference bicycle to determine an image/reference bicycle distance ratio. In particular, the application 406 receives a measurement of the distance between the hubs of the user's reference bicycle in operation 614 above (e.g., 40 inches or some other distance). The application 406 may then correlate the received reference hub distance (e.g., 40 inches) to the length 812 within the digital image 800 (e.g., 40,000 pixels between indicated point 810 and indicated point 806 within image 800) to determine a ratio of reference inches to image length. In this example, the ratio may provide a 1000/1 pixel-to-inch ratio such that each pixel in the image 800 corresponds to 0.001 inches of the reference bicycle. It should be appreciated, however, that other systems of measurements may be utilized by the application 406, such as metric measurements of the dimensions of the reference bicycle and within the digital image 800. Thus, image distance 812 may be expressed in millimeters or other measurements other than pixels. Regardless of the measurement system used to express the distance of the reference bicycle and/or the distance within the image 800, the application 406 may determine a ratio of reference distance to image distance. Further, other reference measurements may be used by the application 406 to determine the ratio. For example, the application 406 may receive a reference distance of the seat tube, top tube, or other component of the reference bicycle. A similar distance may be provided within the image 800 through an indication of one or more locations within the image from which the ratio of image length to reference bicycle length may be obtained or determined.

In operation 906, the application 406 may determine a stack height, reach distance, and/or offset angle for the handlebar indicator 804 within the image 800. For example, the application 406 receives an indication 804 within the image 800 of the handlebars of the reference bicycle (see FIG. 7C). One or more related dimensions of the reference bicycle may be determined from the indicated handlebar location 804 and the indicated bottom bracket location 808 (received via user interface 710 of FIG. 7E). In one instance, the application 406 may determine a vertical distance 814 (also known as the handlebar stack height) from the bottom bracket location 808 to the handlebar location 804. This handlebar stack height 814 may be measured in the image 800 in a similar manner as hub distance 812 (such as in number of pixels, millimeters, etc.). The application 406 may also determine a horizontal distance 816 (also known as the handlebar reach) from the bottom bracket location 808 to the handlebar location 804. In some instances, an offset angle (not shown) may also be determined between the bottom bracket location 808 to the handlebar location 804 indicating an angle of the handlebar location 804 from a vertical or horizontal reference.

Similarly, in operation 908, the application 406 may determine a stack height, reach distance, and/or offset angle for the seat indicator 802 within the image 800 received via user interface 704 of FIG. 7B. In one instance, the application 406 may determine a vertical distance 818 (also known as the seat stack height) from the bottom bracket location 808 to the seat location 802. As should be appreciated, the seat stack height 818 may include the handlebar stack height 814 plus a distance between the handlebar stack height and the seat height. In this manner, the application 406 may also determine the difference between the handlebar stack height 814 and the seat stack height 818. The application 406 may also determine a horizontal distance 820 (also known as the seat reach) from the bottom bracket location 808 to the handlebar location 802. In some instances, an offset angle (not shown) may also be determined between the bottom bracket location 808 to the seat location 802 indicating an angle of the handlebar location 804 from a vertical or horizontal reference. The measurements of the seat stack, reach, and/or offset angle may be made in a similar manner as above.

In operation 910, the application 406 may apply the determined ratio of reference distance to image distance to the handlebar image distances (stack, reach, angle, etc.) and the seat image distances (stack, reach, angle, etc.) to determine one or more target dimensions of the adjustable stationary bicycle. In particular, the application 406 may convert the determined distances within the digital image 800 to a reference distance based on the determined ratio. For example, continuing the above example with a 0.001 pixels-to-inches ratio, the application 406 may determine a handlebar reach distance 816 of 10,000 pixels within the image 800 as correlating to an estimated handlebar reach length of the reference bicycle of 10 inches. A similar transformation of the determined image lengths (handlebar stack, seat stack/reach, offset angles, etc.) may be applied by the application 406 to obtain estimated dimensions of the reference bicycle. In general, any number of dimensions of the reference bicycle may be obtained through the input of reference locations within the image 800 once a reference ratio is determined. Further, additional location indicators within the image 800 may provide the application 406 with greater flexibility to determine more dimensions of the reference bicycle. The estimated bicycle reference dimensions may be used by the application 406 as target settings of the stationary bicycle 100 to correspond the stationary bicycle dimensions to the reference bicycle dimensions, as explained in more detail below.

In other instances, the application 406 may calculate or translate information provided via a professional or third party bicycle fit report input to the application 406 by the user. In some instances, one or more bicycle dimensions may be retrieved from the one or more bicycle fit reports provided. Correlation between the fit report measurements and the application may be achieved through an API that translates various fit report formats into a common format of the application, or a user interface may be provided where a user can assign fit report measurements to various locations from the user interfaces of FIGS. 7A-7H. In other instances, one or more bicycle dimensions may be calculated from the information provided in the bicycle fit report.

In still other instances, the application 406 may utilize the dimension information of the user's body provided by the user to determine one or more stationary bicycle 100 dimensions or settings to fit the user's body shape and size. For example, the application 406 may include a stored table that correlates body measurements (such as the user's weight, height, wingspan, arm length, inseam, etc.) to particular target stationary bicycle dimensions, such as a height a user correlated to a stack height setting of the stationary bicycle 100. In general, the application 406 may translate the information or input provided to the application by the user into one or more estimated dimensions of the user's outdoor bicycle for use in generating stationary bicycle dimension settings.

With the target dimensions for the stationary bicycle 100 determined based on the reference bicycle image 800 (or other source of target stationary bicycle dimensions), the application 406 may return to the method 500 of FIG. 5 and, in operation 506, access one or more adjustment constraints associated with the stationary bicycle type. In general, the adjustable stationary bicycle 100 may be associated with one or more adjustment constraints that may include information on maximum and minimum possible settings or dimensions associated with the stationary bicycle 100. For example, some stationary bicycles may include different adjustment mechanisms with corresponding maximum or minimum settings that are possible through an adjustment of the mechanisms. The maximum and/or minimum adjustments available for the particular stationary bicycle 100 being adjusted may thus be obtained by the application 406 for use in determining the settings of the adjustment mechanisms for the stationary bicycle 100. Alternate or other stationary bicycle designs and/or types may include different ranges of adjustment possible through the corresponding adjustment mechanisms for those bicycles. Other adjustment constraints may be based on an intended appearance of the stationary bicycle 100 or other design considerations. As such, each adjustable stationary bicycle supported by the bicycle fit application 406 may have a corresponding collection of adjustment constraints or other parameters that limit the potential range of dimensional adjustments available from the bicycle 100.

The stationary bicycle adjustment constraint information may be received or determined through an identification of a type or product identifier of the bicycle 100. For example, the computing device 402 may communicate with the stationary bicycle 100 via the bicycle control application 404. The control application 404 may receive, from the stationary bicycle 100, a signal with some type of identification of the bicycle, such as a product name, version number, manufacturer, etc. The bicycle fit application 406 may include a stored table with various bicycle makes and models and constraint information associated with one or more of the bicycle models. With the information obtained from the bicycle 100, the fit application 406 may determine the various dimension settings to be used during calculation of the bicycle settings. For example, some stationary bicycles 100 may include a center post 102 adjustment that extends or contracts the length of the center post while others may have a fixed center post length. In another example, more adjustment mechanisms than discussed herein may be included on the stationary bicycle 100 such that additional dimensional adjustments may be obtained. In still another example, a stationary bicycle 100 may have a fixed crank length while others may have a variable crank length. The inclusion of particular adjustment mechanisms, as well as the adjustment range for each adjustment mechanism associated with the stationary bicycle 100, may be included in the adjustment constraints accessed by the application 406. In some instances, one or more default constraints may be selected and used by the fit application 406 if one or more associated constraints cannot be determined from the bicycle identification. In another instance, the bicycle constraints may be provided by the user via the user interface or other input to the bicycle fit application 406.

In operation 508, the fit application 406 may calculate or otherwise determine one or more corresponding settings or adjustments to the adjustment mechanisms of the stationary bicycle 100 to approximate the dimensions of the reference bicycle or other source of the target dimensions. For example, the application 406, as described above, may estimate the handlebar stack height of the reference bicycle from the information provided via the user interfaces. The handlebar stack height is illustrated in FIG. 8 as length 814. As described, this length 814 may be translated to a target length for the handlebar stack height on the stationary bicycle 100 that corresponds to an estimate of the real-world length of the handlebar stack height of the reference bicycle. To achieve a handlebar stack height on the stationary bicycle 100 that corresponds to the target handlebar stack height, settings of one or more adjustment mechanisms of the bicycle may be determined by the application 406. For example and with reference to FIG. 1B, the center post 102 and corresponding length D1 may be adjusted to a length so that handlebar stack height of the stationary bicycle 100 corresponds with the target handlebar stack height. The handlebar post 176 may also be adjusted to a particular setting to adjust length D5, alone or in conjunction with the adjustment of length D1, to also provide the target handlebar stack height. Similarly, a setting for the forward adjustable arm 158 may be determined that adjusts length D3 and provides a target handlebar reach dimension determined above. Settings for the seat post adjustment 162 and rearward adjustable arm 152 may also be determined to adjust length D4 and D2 and provide a target seat height and/or reach.

One example for determining the settings for the various adjustment mechanisms is provided below in relation to the method 1000 of FIG. 10. In general, as the parameters, dimensions, and/or constraints of the stationary bicycle 100 are known or accessible by the application 406, the application 406 may convert the target dimensions into one or more settings of the adjustment mechanisms of the stationary bicycle 100. In one instance, the application 406 may access a storage table of adjustment mechanism settings of the bicycle 100 that correspond with a particular one of several target dimensions. For example, the application 406 may determine a handlebar stack height of 20 inches, a handlebar reach of 10 inches, a seat stack height of 25 inches, and a seat reach of 7 inches. These target dimensions (among others, such as offset angle, crank length, etc.) may be used to reference a table of adjustment settings for the bicycle 100 adjustment mechanisms that provide the target dimensions.

In other instances, the application 406 may iteratively determine the settings by virtually applying incremental changes to one or more of the settings (such as a frame height setting and/or offset angle) and determining the dimensions of the stationary bicycle 100 based on the incremented settings of the bicycle 100. For example, the application 406 may access the current settings of the adjustment mechanisms of the bicycle 100 through a wired or wireless connection. The application 406 may then determine one or more dimensions (such as handlebar reach/stack, seat reach/stack, offset angle, etc.) from the bicycle settings. In another instance, the application 406 may assume initial bicycle dimensions for purposes of determining the adjustment settings. With the bicycle dimensions known, the application 406 may virtually adjust one or more of the settings and recalculate the bicycle dimensions with the applied settings to determine if the bicycle dimensions are approaching the target dimensions. The application 406 may alter any of the adjustment mechanisms of the bicycle 100 to approach the target dimensions. For example, the application 406 may adjust the center post 102 dimension and/or the seat post 162 dimension to adjust a stack height dimension of the bicycle 100. By incrementally and iteratively adjusting the settings of the bicycle, the application 406 may near the target dimensions. One example process for iteratively determining the settings of the adjustment mechanisms of the bicycle 100 is provided with reference to FIG. 10. The operations of the method 1000 of FIG. 10 may be performed by the application 406 during operation 508 of method 500.

Figure 10:
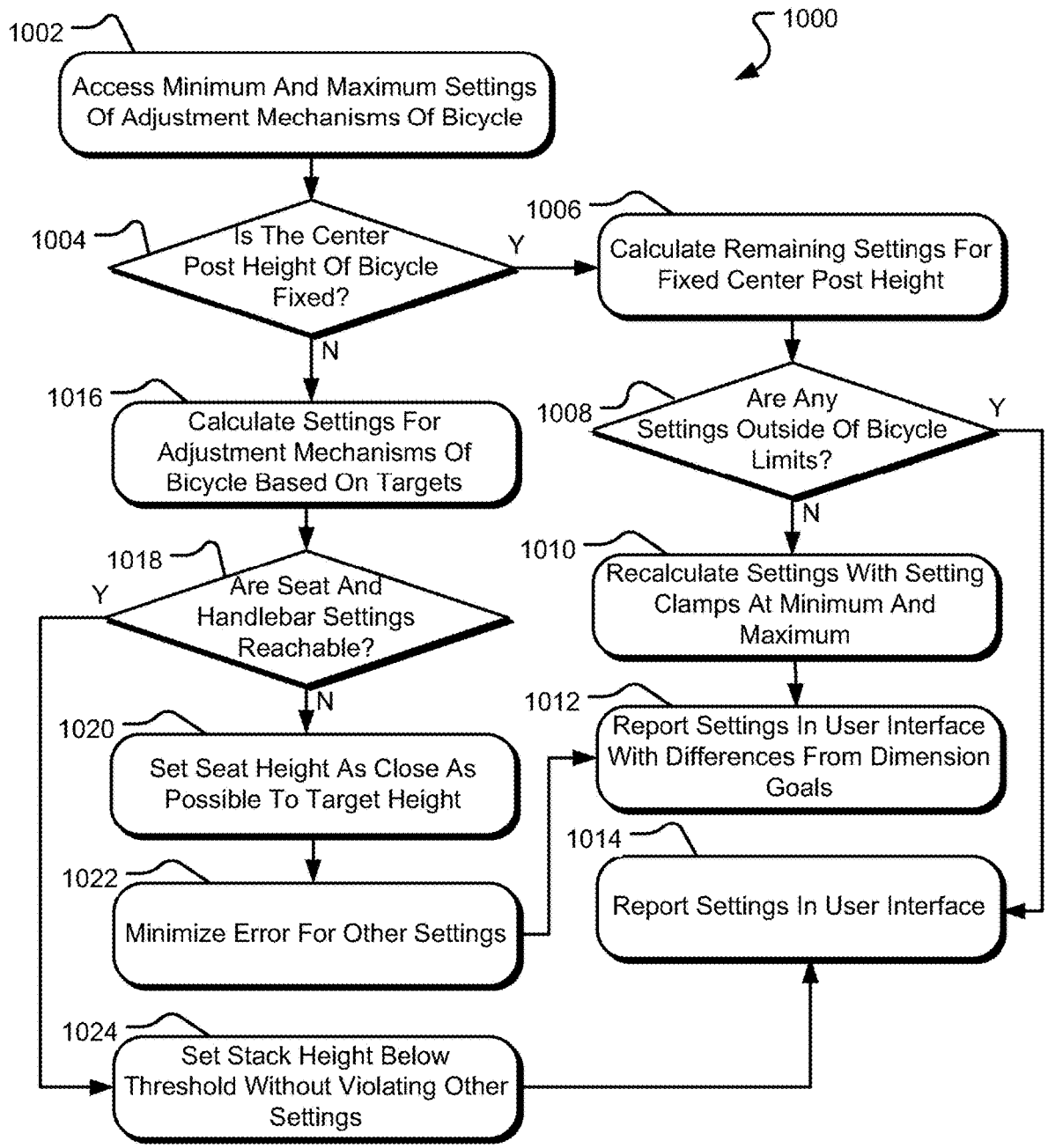
FIG. 10 is a flowchart illustrating a first method for determining one or more dimensional configuration settings of the stationary bicycle training device in accordance with one embodiment.

As mentioned, FIG. 10 is a flowchart illustrating a first method 1000 for determining one or more dimensional configuration settings of the stationary bicycle training device 100. One or more of the operations of the method 1000 of the FIG. 10 may be performed by the bicycle fit application 406 in response to inputs provided to the application. Additional operations or fewer operations may also be executed by the application 406 to determine the bicycle settings. Further, some of the operations may be performed by one or more components of the stationary bicycle 100 in response to instructions provided by the fit application 406.

Beginning in operation 1002, the fit application 406 may access minimum and/or maximum settings for the adjustment mechanisms of the stationary bicycle 100. For example, each stationary bicycle 100 supported by the bicycle fit application 406 may have a maximum and minimum limitation on the various possible adjustments, such as a maximum and minimum center post height, maximum and minimum forward and rearward extensions of the seat assembly and handlebar assembly, and maximum and minimum crank lengths. The maximum and minimum adjustments available for each supported stationary bicycle 100 may be determined from the adjustment constraints obtained or accessed above with reference to operation 506. As should be appreciated, the maximum and minimum settings may vary based on the type and model of stationary bicycle 100 being adjusted, and may be pre-loaded in memory, accessed from a web service, entered through a user interface, etc. or otherwise provided in the adjustment constraints accessed by the application 406.

In operation 1004, the fit application 406 may determine if a center post height of the stationary bicycle 100 is to be fixed. In some instances, the bicycle fit application 406 may provide an option to set the center post height at a particular value, perhaps to match a preference of the user for frame height, to set the same frame height as the reference bicycle, to match a particular appearance of the bicycle frame, etc. In other instances, the bicycle fit application 406 may be used to determine settings of a bicycle that does not include a center post adjustment mechanism such that the center post height is set. Regardless, if the center post height of the bicycle 100 is to be set, the application 406 may calculate, in operation 1006, the remaining settings for the bicycle 100 while maintaining the set center post height. For example, the application 406 may, based on receiving an input indicating a fixed center post height, determine a center post 102 height value to achieve the fixed frame height. To approximate the dimensions of the user's outdoor bicycle, the application 406 may then define one or more settings for the other adjustment mechanisms of the bicycle 100 to define the overall dimensions of the stationary bicycle 100. For example, the fixed center post height may not provide the target handlebar or seat stack height such that an additional extension of the seat assembly or the handlebar assembly may be needed to approximate the target dimensions. The application 406 may thus determine a setting for the seat post adjustment and/or the handlebar adjustment to provide the target handlebar and seat stack height. The seat post and/or handlebar setting may be determined through an iterative process of adjusting the settings and determining a bicycle dimension or through a stored table of setting values. Similarly, the reach setting value and/or the setback setting value may be adjusted to approximate the reach distance of the reference bicycle. In general, values or settings for any adjustment mechanism of the stationary bicycle 100 may be determined or adjusted to approximate the corresponding dimensions of the reference bicycle.

In some instances, the determined settings or values of the adjustment mechanisms of the stationary bicycle 100 may exceed one or more of the maximum or minimum value limitations of the stationary bicycle 100. That is, a determined setting may be outside the range of available settings as determined through the adjustment constraints for the stationary bicycle 100. Thus, in operation 1008, the fit application 406 may determine if any of the determined settings exceed a maximum or minimum value for the bicycle 100 based on the adjustment constraint associated with the stationary bicycle 100. For example, one or more of the adjustment mechanisms of the stationary bicycle 100 may have an associated maximum or minimum setting.

If the settings determined for the adjustment mechanisms of the bicycle 100 are determined to be within the prescribed maximum and minimum limitations for the stationary bicycle 100, the fit application 406 may report the settings via the user interface. For example, the application 406 may display the settings in the user interface and provide one or more instructions on adjusting the mechanisms of the bicycle 100 to achieve the adjustment settings. In some instances, the displayed settings may include a visual marker, such as a number, letter, symbol, etc., that corresponds to a similar marker on the stationary bicycle 100 such that adjustment of the mechanisms of the bicycle 100 may be achieved by adjusting the mechanisms to the displayed settings. As discussed in more detail below, reporting of the settings may also include transmitting one or more control instructions to the bicycle 100 automatically adjust one or more of the mechanisms of the stationary bicycle 100 in response to the determined adjustment settings.

If the application 406 determines that the one or more of the calculated settings are outside the limitations of the mechanisms in operation 1008, the application 406 may recalculate the settings with one or more clamps applied to the calculations. In general, the clamps applied to the calculations may correspond to the maximum and/or minimum values for the bicycle 100. In some instances, each setting or adjustment mechanism may be clamped during a re-calculation. In another instance, clamps may be applied only to the settings that are determined to be exceeded in operation 1008. Clamping of adjustment settings to the corresponding maximum or minimum values may limit the accuracy of the approximation of the reference bicycle such that the dimensions of the stationary bicycle may not reach the target dimensions. In other words, the target dimensions may not be met as the adjusted dimensions of the stationary bicycle 100 may be limited. However, the determined settings may approximate the target dimensions accurately given the clamps applied to the adjustment dimensions. In operation 1012, the settings may be reported to the user or bicycle 100 via the user interface or via instructions to the bicycle. In addition to reporting the settings, the application 406 may also report one or more differences between the provided or displayed settings and a target setting or value that exceeds the maximum and minimum clamp. Through the displayed differences, the user or bicycle may determine how accurate the provided stationary bicycle 100 settings are to the reference bicycle or other reference dimensions.

Returning to operation 1004, the application 406 may determine that a fixed center post height is not provided and, therefore, the height of the center post 102 may be adjusted along with the other settings of the stationary bicycle 100. In operation 1016, the application 406 may determine the settings for one or more of the adjustment mechanisms of the stationary bicycle 100 based on the target dimensions or values determined above. For example, the application 406 may use the target dimensions to access a look-up table that provides corresponding adjustment mechanism settings for the target dimensions. The look-up table may correspond to the particular stationary bicycle 100 being adjusted. In another example, the application 406 may assume one or more initial settings for the adjustment mechanisms of the bicycle 100 and iterate through incremental changes to the bicycle while determining the dimensions of the bicycle based on those changes. In one instance, the application 406 may include a hierarchy of adjustments applied to approximate the target dimensions. For example, the application 406 may first adjust the center post 102 incrementally until the target dimensions are as close as can reached through adjustment of the center post 102. Incremental adjustments to the other mechanisms (the forward and rearward adjustment arms, the seat post, the handlebar post, etc.) may then be performed by the application until the target dimension or an estimate of the target dimension is reached. However, other implementations may prioritize other adjustment mechanisms first other than the center post. Through this iterative process of adjusting settings of the bicycle 100, the application 406 may hone in on the target dimensions corresponding to the reference bicycle.

In general, the target dimensions may include a seat stack value, a seat reach value, a handlebar stack value, and a handlebar reach value, among other possible target dimensions. Thus, as the application 406 iterates through the settings as described, the application may compare seat reach/stack and handlebar reach/stack to similar target values for the seat and handlebar position. The process may continue until the settings for the adjustment mechanisms set the dimensions of the adjustable bicycle 100 at or near the target dimensions. However, some target dimensions may not be possible given the physical adjustment constraints of the bicycle 100. Thus, in operation 1018, the application 406 may determine if the seat and handlebar settings are reachable by the corresponding adjustment mechanisms of the stationary bicycle 100 based on the adjustment constraints of the stationary bicycle 100. If the seat and handlebar settings are reachable, the application 406 may set the stack height (or center post 102) below a threshold value for that setting without violating the other settings (handlebar and seat settings). For example, the adjustment constraints for the stationary bicycle 100 access by the application 406 may include a preference for a center post height below a threshold value. The threshold value for the center post 102 may be set to ensure an appearance of the stationary bicycle 100 based on the other settings of the bicycle or for any other reason. Regardless of the purpose behind the center post 102 height threshold value, the application may attempt to set the center post height below that value if doing so does not violate the other determined settings to provide the approximated target dimensions of the stationary bicycle 100. In some instances, the center post 102 may not be set below the threshold value without violating the other settings such that the center post height setting is not set below the threshold value. The application 406 may then proceed to operation 1014 to report the settings to the user interface or bicycle 100 as described above.

If the application 406 determines that the seat and handlebar settings are not reachable in operation 1018, the application 406 may determine adjustment mechanism settings of the bicycle 100 to set the seat height close to the target seat height while within the maximum or minimum settings of the seat adjustment mechanism in operation 1020. With this setting, the application 406 may then minimize the error for the other adjustment settings of the stationary bicycle 100 in operation 1022. In general, minimizing the error for the other settings may include determining the other setting values as close to the target value as possible without violating the maximum or minimum values for the associated mechanism. Once determined, the application 406 may report the determined setting values in the user interface or to the bicycle in operation 1012, as described above. The application 406 may also report the differences from the provided settings and the target settings, as also described.

In some instances, the settings of the adjustment mechanisms of the stationary bicycle 100 may be provided on a display associated with the computing device 402 so that the user may manually adjust the stationary bicycle 100 accordingly. For example, a calculated center post 102 setting may be provided to the user for manual adjustment of the center post 102. One or more indicators of the different adjustment settings may be printed on the adjustment mechanisms or the bicycle 100 or otherwise provided to the user for quick adjusting of the various adjustment mechanisms. Further, the control circuit of the stationary bicycle 100 may include one or more storage devices to store the settings for one or more riders or users of the stationary bicycle 100. For example, a first rider may have a first set of adjustment settings that correspond to the first rider's preferences or dimensions of the first rider's outdoor bicycle. These settings may be stored in a storage device and associated with the first rider's identity as a first rider profile. When an indication of the first rider is provided to the control circuit (such as through an input device associated with the bicycle 100 or through a mobile device carried by the rider), the stationary bicycle 100 may provide the stored settings to the user via the user interface of the application 406. In one example, the indication of the first rider provided to the stationary bicycle may include an identification signal transmitted to the control circuit from a mobile device carried by or otherwise associated with the first rider. In a similar manner, a second rider's settings may also be stored in the storage device of the control circuit for adjustment of the stationary bicycle to conform to the second rider's preferences when an indication of the second rider is provided to the control circuit of the bicycle. Further, more than one setting profile may be associated with a user, such as when the user has two or more bicycles. The user may select from the multiple stored profiles as desired based on which of the outdoor bicycles the user prefers the stationary bicycle 100 to approximate. In general, any number of settings profiles for any number of riders of the stationary bicycle may be stored and used to adjust the dimensions of the bicycle.

Figure 11A:
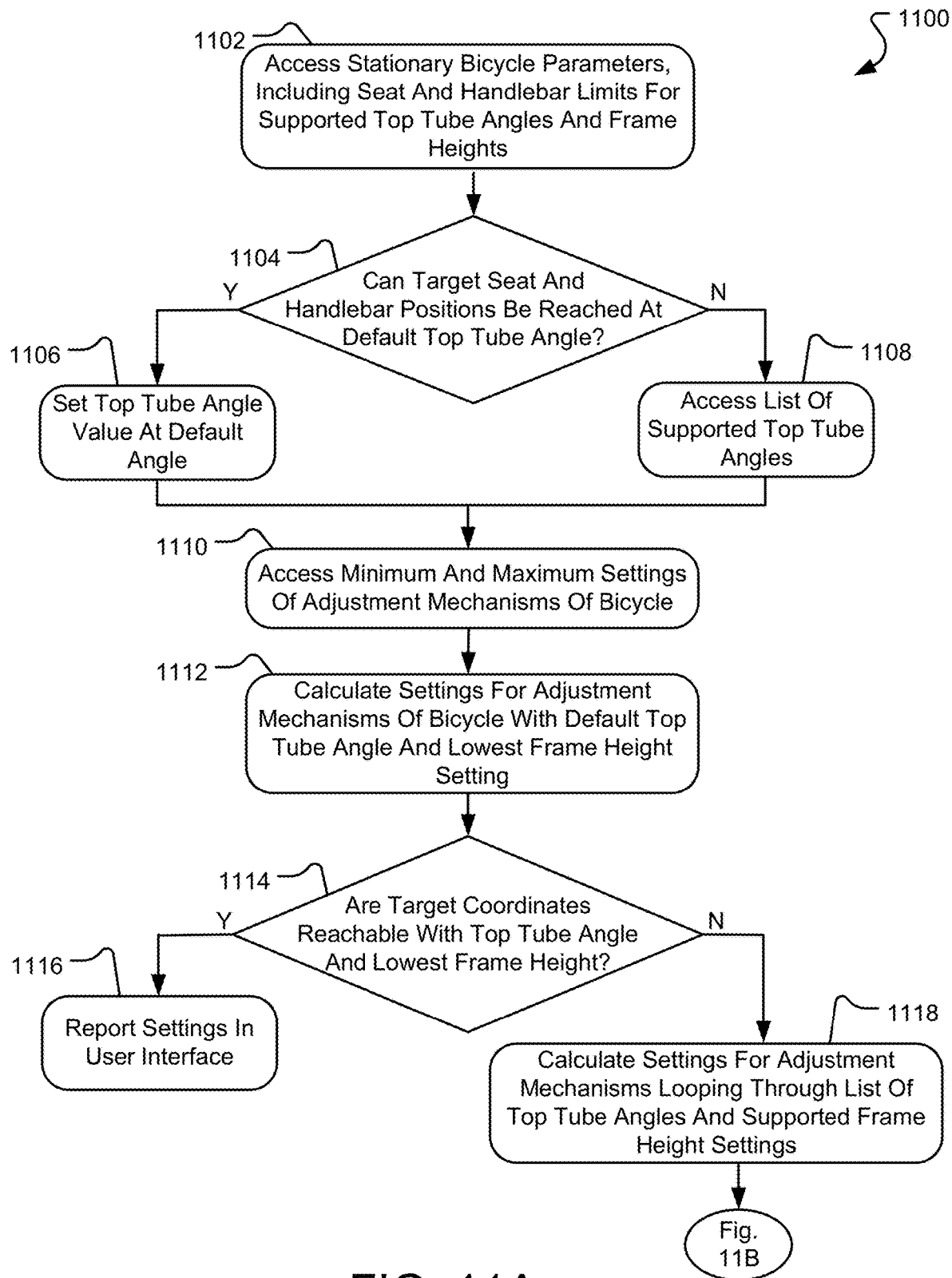
FIGS. 11A and 11B are flowcharts illustrating a second method for determining one or more dimensional configuration settings of the stationary bicycle training device in accordance with one embodiment.
Figure 11B:
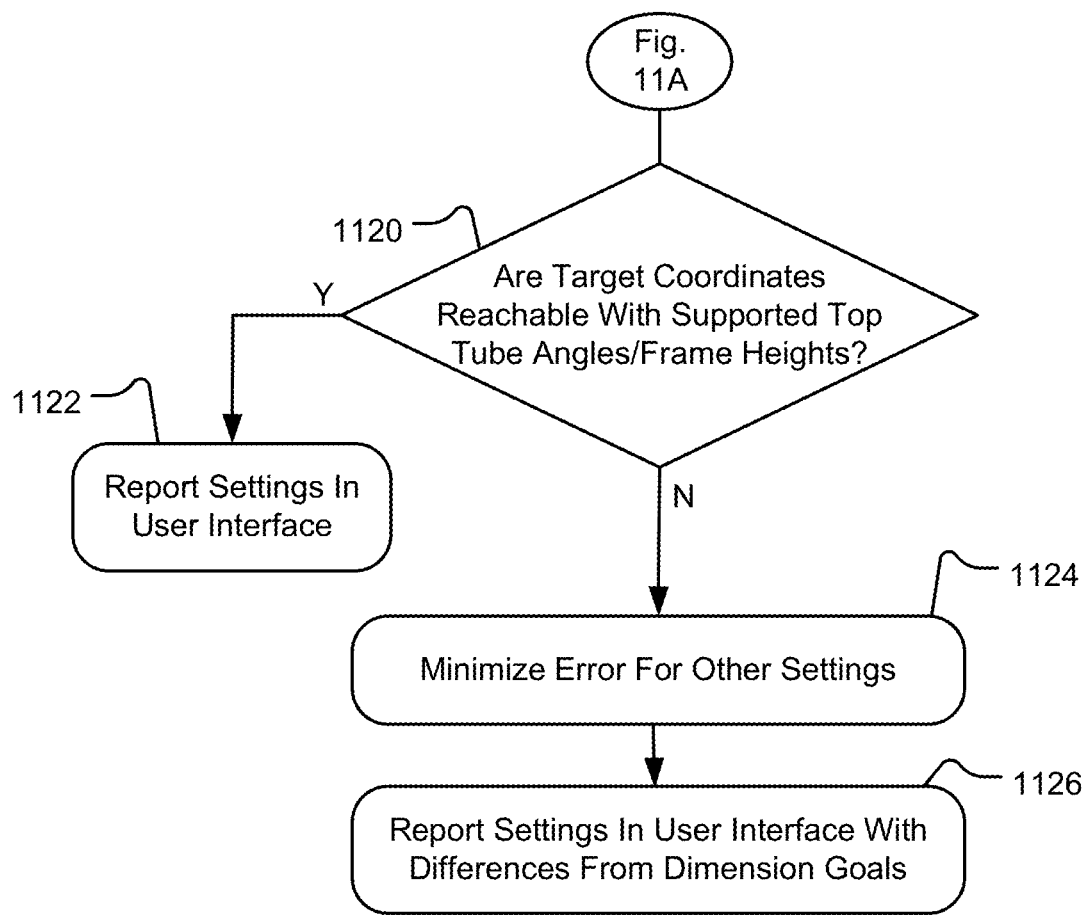

FIGS. 11A and 11B are a flowchart illustrating a second method 1100 for determining one or more dimensional configuration settings of the stationary bicycle training device 100. Similar to the method above, one or more of the operations of the method 1100 may be performed by the bicycle fit application 406 in response to inputs provided to the application. Additional operations or fewer operations may also be executed by the application 406 to determine the bicycle settings. Further, some of the operations may be performed by one or more components of the stationary bicycle 100 in response to instructions provided by the fit application 406.

Beginning in operation 1102, the fit application 406 may access parameters of the stationary bicycle to be adjusted. In some instances, the stationary bicycle parameters may include a list of top tube angles and frame heights (center post heights) available or supported by the stationary bicycle to be adjusted. A top tube angle may be angle 103 illustrated in FIG. 1B and correspond to an angle from a vertical y-axis reference from the center of the drive sprocket 116 and a center line through the center post 102. A larger or smaller top tube angle 103 may be achieved through a pivoting of the center post 102 more forward or more rearward, such as through tilting mechanism 202 described above. In particular, the top tube 106 may be rotated clockwise by tilting the center post 102 forward and the top tube 106 may be rotated counter-clockwise by tilting the center post 102 rearward. The rotation of the top tube 106 in response to the titling of the center post 102 may adjust the top tube angle 103 (measured as the angle between a line along the axis of the center post 102 and the vertical Y-axis 105 as shown in FIG. 1B).

In a first example, a stationary bicycle may include a fixed top tube angle that cannot be adjusted by an adjustment mechanism. The parameters associated with the stationary bicycle may then include an indication that the top tube angle 103 is fixed. Other stationary bicycles may include an adjustable top tube angle 103 and the parameters of such a stationary bicycle may include an indication of the variability of the top tube angle 103, such as a supported maximum and/or minimum angle. In another example, the parameters of the stationary bicycle may indicate available top tube angles between the maximum and minimum values, such as available top tube angles at every 10 degrees from a vertical reference line, every 5 degrees from a vertical reference line, and the like. Other maximum and/or minimum values and available settings for each adjustment mechanism of the stationary bicycle 100 may be also be included in the parameters, such as parameter information for the center post 102 height, seat stack height and/or reach, handlebar height and/or reach, and the like. As should be appreciated, the parameter values for the stationary bicycle 100 may vary based on the type and model of stationary bicycle 100 being adjusted, and may be pre-loaded in memory, accessed from a web service, entered through a user interface, etc. or otherwise provided in the adjustment constraints accessed by the application 406.

In addition to the limitations for the various adjustable mechanisms and/or dimensions of the stationary bicycle 100, the parameters accessed may also include limitations to combinations of the adjustment mechanisms of the bicycle 100. For example, the parameters may include a maximum and/or minimum seat position available at particular top tube angles of the stationary bicycle 100. In some instances, adjusting the top tube angle 103 of the stationary bicycle 100 may provide for variable seat and/or handlebar positioning. Thus, for each top tube angle 103 available through the stationary bicycle 100, a maximum and/or minimum position for the seat assembly and/or handlebar assembly may be provided in the parameters for the bicycle 100. A similar collection of available seat and handlebar locations may be correlated with available center post 102 heights of the stationary bicycle 100 and indicated in the parameters of the bicycle. Other stationary bicycle 100 information, such as a default center post 102 height and/or default top tube angle 103, may also be included in the parameters for the bicycle.

With the parameter information accessed, the fit application 406 may determine, in operation 1104, if the target seat and handlebar positions may be reached at the default top tube angle 103. As explained above, the parameters of the stationary bicycle 100 may include a default top tube angle 103 for the bicycle and limits on the position of the seat and/or handlebars reachable with the top tube angle 103 set at the default value. If the target seat and/or handlebar positions can be reached with the default top tube angle 103 for the stationary bicycle 100, the fit application 406 may set the top tube angle 103 to the default angle or value in operation 1106. If, however, the target seat and/or handlebar positions cannot be reached with the default top tube angle 103 for the stationary bicycle 100, the fit application 406 may access a list of supported top tube angles 103 of the stationary bicycle 100 in operation 1108. As mentioned above, the parameters associated with the stationary bicycle 100 may include the top tube angles 103 available from the stationary bicycle 100, including differences in values of the top tube angle 103 between one setting and the next. The available top tube angles 103 of the stationary bicycle 100 may thus be accessed.

In operation 1110, the fit application 406 may access minimum and/or maximum settings for the adjustment mechanisms of the stationary bicycle 100. For example, each stationary bicycle 100 supported by the bicycle fit application 406 may have a maximum and minimum limitation on the various possible adjustments, such as a maximum and minimum center post height, maximum and minimum forward and rearward extensions of the seat assembly and handlebar assembly, and maximum and minimum crank lengths. The maximum and minimum adjustments available for each supported stationary bicycle 100 may be determined from the parameters of the stationary bicycle 100 accessed above. As should be appreciated, the maximum and minimum settings may vary based on the type and model of stationary bicycle 100 being adjusted, and may be preloaded in memory, accessed from a web service, entered through a user interface, etc. or otherwise provided in the adjustment constraints accessed by the application 406.

In operation 1112, the fit application 406 may calculate the settings for one or more of the adjustment mechanisms of the stationary bicycle 100 based on the target dimensions or values determined above. For example, the application 406 may use the target dimensions to access a look-up table that provides corresponding adjustment mechanism settings for the target dimensions. The look-up table may correspond to the particular stationary bicycle 100 being adjusted. One or more entries in the look-up table may also correspond to one or more set adjustment mechanisms of the bicycle 100. For example, the table may include settings for the forward horizontally adjustable arm 158, the rearward horizontally adjustable arm 152, the seat stem 162, the handlebar stem 176, the center post 102 height, and the like for particular seat and handlebar locations based on a set top tube angle 103 such that the fit application 406, utilizing a set top tube setting, may determine the settings for the adjustment mechanisms of the stationary bicycle 100 to achieve the seat and handlebar locations. In one particular instance, the fit application 406 may further set the frame height (corresponding to the height of the center post 102) at the lowest available setting. Thus, the fit application 406 may, in this instance, set the top tube angle 103 at the default angle and the center post 102 height at the lowest (or shortest) setting to determine the settings of the other adjustment mechanisms of the stationary bicycle 100 (such as the forward horizontally adjustable arm 158, the rearward horizontally adjustable arm 152, the seat stem 162, the handlebar stem 176, etc.). In some instances, the target seat and handlebar locations may not be reachable with the set top tube angle 103 and/or the center post 102 height, as addressed below.

In some instances, the application 406 may assume one or more initial settings for the adjustment mechanisms of the bicycle 100 (such as the default top tube angle 103 and/or the center post 102 height) and iterate through incremental changes to the adjustment mechanisms while determining the dimensions of the bicycle based on those changes. In one instance, the application 406 may include a hierarchy of adjustments applied to approximate the target dimensions. For example, the application 406 may first adjust the rearward horizontally adjustable arm 152 incrementally until the seat location of the bicycle 100 is close to the target seat location before determining the adjustment to the seat stem 162. Incremental adjustments to the other mechanisms may also be performed by the application 406 until the target dimension or an estimate of the target dimension is reached.

In operation 1114, the fit application 406 may determine if the target seat and/or handlebar locations of the stationary bicycle 100 are reachable with the default top tube angle and the lowest center post 102 height set. If the target seat and/or handlebar locations are reachable at the default top tube angle 103 and lowest center post 102 height, the fit application 406 may, in operation 1116, report the calculated settings in the user interface as described above. If the target seat and/or handlebar locations are not reachable at the default top tube angle 103 and lowest center post 102 height, the fit application 406 may loop through the available or supported top tube angles 103 and supported center post 102 height settings of the stationary bicycle 100 to attempt to reach the target seat and/or handlebar locations in operation 1118. In one example, the fit application 406 may first select a top tube angle 103 setting that is closest to the default top tube angle 103 (either in the clockwise or counter-clockwise direction) in which the target seat and/or handlebar locations is reachable. As mentioned above, the parameters associated with the stationary bicycle 100 may include a list of available top tube angles 103 for the bicycle and the maximum (or minimum) seat and handlebar locations for the top tube settings. Thus, the fit application 406 may determine which of the supported top tube settings of the bicycle 100 provide for reaching the target seat and/or handlebar locations that is closest to the default top tube setting (also included in the parameters). In some instances, the target locations for the seat and handlebars may be outside all reachable locations for the settings of the top tube angle 103. In such instances, the fit application 406 may select the maximum or minimum supported top tube angle 103, whichever provides the closest reach to the target seat and/or handlebar locations.

With the top tube angle 103 setting selected, the fit application 406 may then determine a center post 102 or frame height setting that approximates the target seat and/or handlebar locations as close as possible given the limitations of the stationary bicycle 100 adjustment mechanisms and the selected top tube angle 103 setting. The fit application 406, through these calculations, may determine or calculate one or more settings of the various adjustment mechanisms of the stationary bicycle 100 to approximate the dimensions of the reference bicycle, as described above.

The fit application 406 may, in operation 1120 of FIG. 11B, determine if the target coordinates of the adjustable bicycle 100 are reachable given the selected top tube angle 103 setting and center post 102 height setting. If yes, the determined settings may be reported to the user interface in operation 1122 and as described above. If the target dimensions are still not reachable, the fit application 406 may then minimize the error across all of the settings of the adjustment mechanisms of the stationary bicycle 100 in operation 1124. In general, minimizing the error for the other settings may include determining the setting values of the adjustment mechanisms as close to the target value as possible without violating the maximum or minimum values for the associated mechanism. Once determined, the application 406 may report the determined setting values in the user interface or to the bicycle in operation 1126, as described above. The application 406 may also report the differences from the provided settings and the target settings, as also described.

Figure 12:
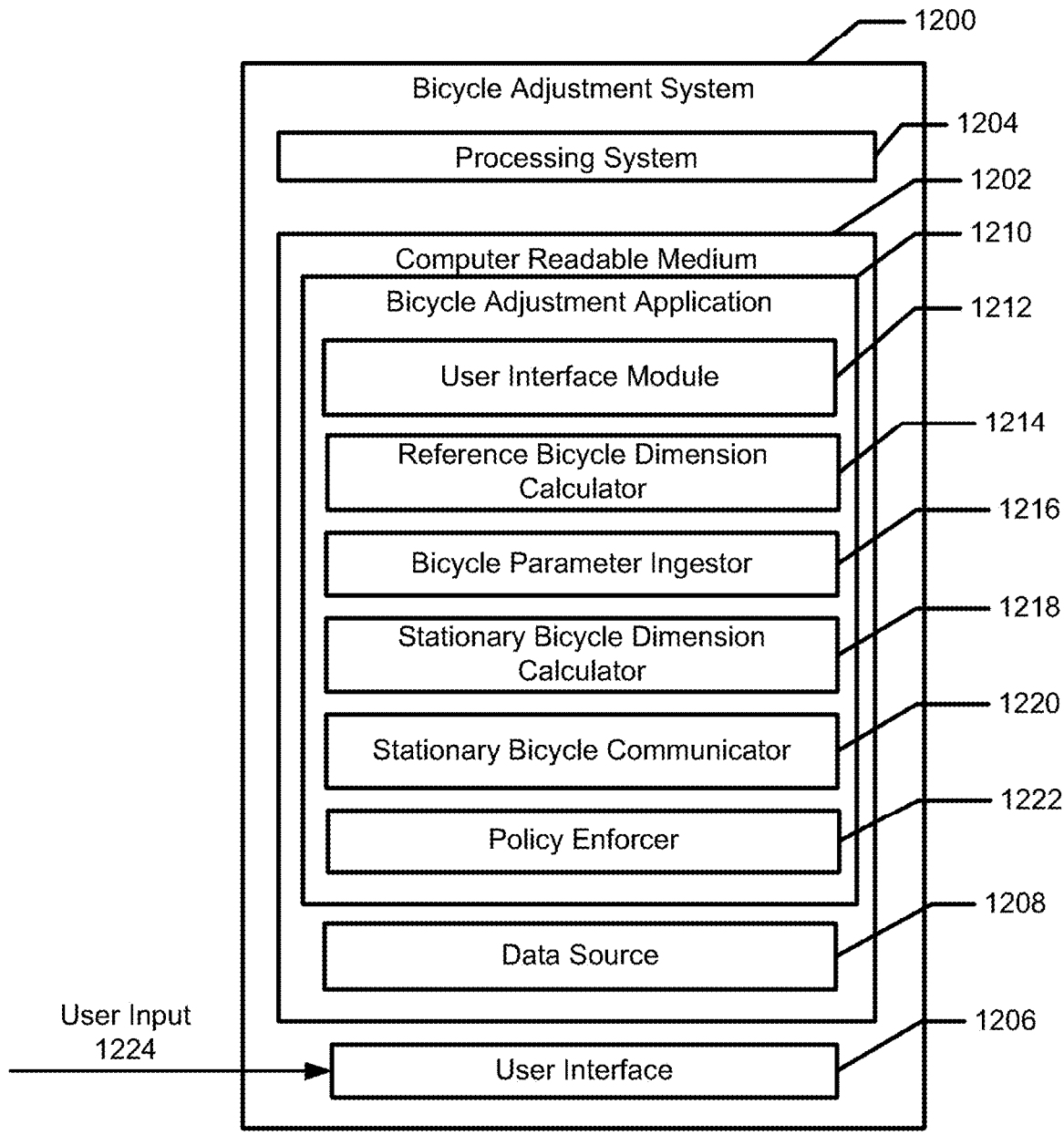
FIG. 12 is a schematic diagram illustrating a bicycle adjustment system for adjusting one or more dimensions or adjustment mechanism of a stationary bicycle in accordance with one embodiment.

FIG. 12 is a schematic diagram illustrating a bicycle adjustment system 1200 for adjusting one or more dimensions or adjustment mechanism of a stationary bicycle 100. The bicycle adjustment system 1200 may include portions or the computing device 402 discussed above. In some instances, a bicycle adjustment application 1210 may be executed on the bicycle adjustment system 1200 to perform one or more of the operations described herein. The bicycle adjustment application 1210 may be stored in a computer readable media 1202 (e.g., memory) and executed on a processing system 1204 of the bicycle adjustment system 1200 or other type of computing system. For example, the bicycle adjustment application 1210 may include instructions that may be executed in an operating system environment, such as a Microsoft Windows™ operating system, a Linux operating system, or a UNIX operating system environment. The computer readable medium 1202 includes volatile media, nonvolatile media, removable media, non-removable media, and/or another available medium. By way of example and not limitation, non-transitory computer readable medium 1202 comprises computer storage media, such as non-transient storage memory, volatile media, non-volatile media, removable media, and/or non-removable media implemented in a method or technology for storage of information, such as computer readable instructions, data structures, programs, or other data.

According to one embodiment, the bicycle adjustment system 1202 also provides a user interface (e.g., a command line interface (CLI), a graphical user interface (GUI), etc.) 1206 displayed on a display, such as a computer monitor or display of a mobile device, for displaying data. Through the user interface 1206, a user of the bicycle adjustment system 1200 may provide customer input 1224 through one or more input devices. The customer input 1224 may be used by the bicycle adjustment system 1200 to, among other things, determine estimated dimensions of a user's outdoor bicycle or body type and provide one or more adjustment settings for a stationary bicycle 100 to approximate the dimensions of the user's outdoor bicycle. The input device for providing the customer input 1224 may include, among others, a touchscreen, a keyboard. or a pointing device (e.g., a mouse, trackball, pen, or touch screen) to enter data into or interact with the user interface 306.

In one example, the user interface 1206 may communicate with other components in the bicycle adjustment application 1210 to receive user input for manipulating or otherwise modifying the operation of the bicycle adjustment application. For example, user interface controller 1212 may communicate with user interface 1206 to receive customer input 1224 for use by the bicycle adjustment application 1210. The user interface controller 1212 may also provide information to for display via the user interface 1206, such as settings for the stationary bicycle 100.

The bicycle adjustment application 1210 may also utilize a data source 1208 of the computer readable media 1202 for storage of data and information associated with the bicycle adjustment system 1200. For example, the bicycle adjustment application 1210 may store one or more tables or entries that correlate a stationary bicycle identifier with one or more parameters of the bicycle. In another example, the data source 1208 may include one or more tables to dimension adjustment preferences associated with a stationary bicycle 100. In general, any data or information utilized by the bicycle adjustment application 1210 may be stored and/or retrieved via the data source 1208.

The security management application 1210 may perform one or more of the operations described herein. For example, a reference bicycle dimension calculator 1214 may be included in the application 1210 to determine or estimate one or more dimensions of a reference bicycle. The reference bicycle may be included in a digital image and information associated with the image may be provided to the application 1210 via the user input 1224. The reference bicycle dimension calculator 1214 may then analyze the information provided, the reference digital image, and/or other sources of information to determine or estimate one or more dimensions of the reference bicycle. The reference bicycle dimensions may be utilized by the application 1210 to determine one or more settings of an adjustable stationary bicycle 100, as described herein.

In addition, the application 1210 may include a bicycle parameter ingestor 1216 to receive or determine one or more parameters or adjustment constraints of a stationary bicycle 100 based on an identifier of the bicycle. The parameter ingestor may determine one or more limits on adjustment mechanisms of the bicycle 100 as well as one or more preferences associated with the bicycle. In some instances, such information may be obtained from the data source 1208 of the computer readable medium 1202. In addition, the application 1210 may include a policy enforcer 1222 configured to enforce one or more policies based on the parameters received or determined by the parameter ingestor 1216. For example, the policy enforcer 1222 may determine a maximum and/or minimum adjustment setting for the bicycle 100 and apply one or more clamps to suggested adjustments to the stationary bicycle 100. These values may be based on the parameters associated with the bicycle.

Further, the application 1210 may include a stationary bicycle dimension calculator 1220 for determining one or more settings of one or more adjustment mechanisms of a stationary bicycle. The stationary bicycle dimensions or settings may be based on the determined reference bicycle dimensions to approximate the dimensions of the reference bicycle. A stationary bicycle communicator 1220 may also be included in the application 1210 to communicate with the stationary bicycle. Communications may include receiving information from the stationary bicycle 100 and/or providing one or more instructions to configure the stationary bicycle, perhaps in response to the calculated stationary bicycle dimensions.

Figure 13:
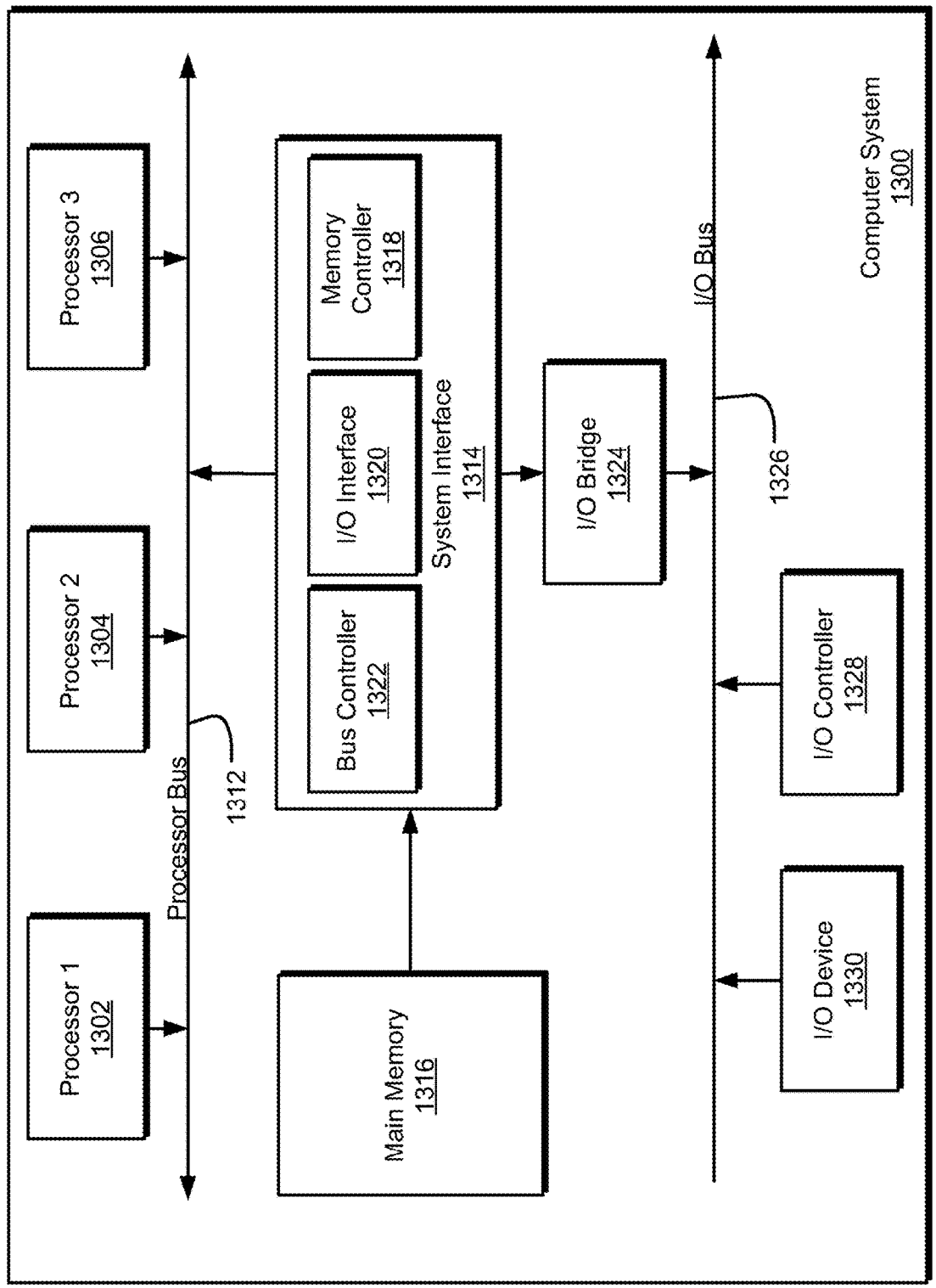
FIG. 13 is a diagram illustrating an example of a computing system which may be used in implementing embodiments of the present disclosure.

FIG. 13 is a block diagram illustrating an example of such a computing device or computer system 1300 which may be used in implementing the embodiments of the computing device 402 disclosed above. The computer system (system) includes one or more processors 1302-1306. Processors 1302-1306 may include one or more internal levels of cache (not shown) and a bus controller or bus interface unit to direct interaction with the processor bus 1312. Processor bus 1312, also known as the host bus or the front side bus, may be used to couple the processors 1302-1306 with the system interface 1314. System interface 1314 may be connected to the processor bus 1312 to interface other components of the system 1300 with the processor bus 1312. For example, system interface 1314 may include a memory controller 1314 for interfacing a main memory 1316 with the processor bus 1312. The main memory 1316 typically includes one or more memory cards and a control circuit (not shown). System interface 1314 may also include an input/output (I/O) interface 1320 to interface one or more I/O bridges or I/O devices with the processor bus 1312. One or more I/O controllers and/or I/O devices may be connected with the I/O bus 1326, such as I/O controller 1328 and I/O device 1330, as illustrated.

I/O device 1330 may also include an input device (not shown), such as an alphanumeric input device, including alphanumeric and other keys for communicating information and/or command selections to the processors 1302-1306. Another type of user input device includes cursor control, such as a mouse, a trackball, or cursor direction keys for communicating direction information and command selections to the processors 1302-1306 and for controlling cursor movement on the display device.

System 1300 may include a dynamic storage device, referred to as main memory 1316, or a random access memory (RAM) or other computer-readable devices coupled to the processor bus 1312 for storing information and instructions to be executed by the processors 1302-1306. Main memory 1316 also may be used for storing temporary variables or other intermediate information during execution of instructions by the processors 1302-1306. System 1300 may include a read only memory (ROM) and/or other static storage device coupled to the processor bus 1312 for storing static information and instructions for the processors 1302-1306. The system set forth in FIG. 13 is but one possible example of a computer system that may employ or be configured in accordance with aspects of the present disclosure.

According to one embodiment, the above techniques may be performed by computer system 1300 in response to processor 1304 executing one or more sequences of one or more instructions contained in main memory 1316. These instructions may be read into main memory 1316 from another machine-readable medium, such as a storage device. Execution of the sequences of instructions contained in main memory 1316 may cause processors 1302-1306 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 916, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

Various embodiments of the disclosure are discussed in detail above. While specific implementations are discussed, it should be understood that this is done for illustration purposes only. A person skilled in the relevant art will recognize that other components and configurations may be used without parting from the spirit and scope of the disclosure. Thus, the preceding description and drawings are illustrative and are not to be construed as limiting. Numerous specific details are described to provide a thorough understanding of the disclosure. However, in certain instances, well-known or conventional details are not described in order to avoid obscuring the description.

References to one or an embodiment in the present disclosure can be references to the same embodiment or any embodiment; and, such references mean at least one of the embodiments. Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. To the extent some embodiments herein are referred to as indoor cycling or indoor training devices, the terms are meant to refer to a device that is not an outdoor bicycle that can be ridden and not meant to infer any other specific meaning or structural requirement. In some instances, the term "center" may be used to refer to some component, which is not meant to imply that the component is necessarily dimensionally or mathematically centered but is rather used generally to indicate a general location or relative location to other components. In some instances, a first side or second side is referenced, and it should be recognized that the first side is not the same side as the second side. In some instances, the terms left or right, or front or back (forward or rearward) are used, and in such cases it may be the case that the terms are used based on the perspective of a user on the indoor cycling bike facing the handlebars. So, for example, the user's left foot would be on the left pedal, right foot on the right pedal, and the handlebars are toward the front.

Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for adjusting a stationary bicycle, the method comprising:
   accessing a digital photographic image of a reference non-stationary bicycle;
   receiving a first input identifying a first aspect of the reference non-stationary bicycle in the digital photographic image and a second input identifying a second aspect of the reference non-stationary bicycle in the digital photographic image;
   determining, based on the first input and the second input, a distance within the digital photographic image between a location of the first aspect of the reference non-stationary bicycle and a location of the second aspect of the reference non-stationary bicycle;
   determining, based on the determined distance, a dimension of a stationary bicycle device;
   determining, based on the determined dimension of the stationary bicycle device, a setting of an adjustable portion of the stationary bicycle device; and
   controlling, based on the setting, an actuator of the adjustable portion to adjust a size of the stationary bicycle device to correspond with the determined dimension.

2. The method of claim 1 wherein the determined distance corresponds to a handlebar reach distance, a handlebar stack height, a seat reach distance, or a seat stack height.

3. The method of claim 1 wherein the stationary bicycle device comprises a pivotal post supporting the stationary bicycle device and by which the stationary bicycle device may be pivoted forwardly or rearwardly, and the determined dimension corresponds to an angle of the pivotal post to orient the stationary bicycle device forwardly or rearwardly.

4. The method of claim 1 wherein determining the dimension of the stationary bicycle device comprises:
   receiving, via a user input on a user interface, a reference distance between the first aspect and the second aspect of the reference non-stationary bicycle;
   correlating the determined distance within the digital photographic image to the reference distance between the first aspect and the second aspect of the reference non-stationary bicycle to determine a digital photographic image distance to a reference bicycle distance ratio; and
   determining, based on the ratio, the dimension of the stationary bicycle device corresponding to the digital photographic image of the reference non-stationary bicycle.

5. The method of claim 1 wherein the stationary bicycle device comprises at least five distinct adjustable portions to alter a corresponding dimension of the stationary bicycle device.

6. The method of claim 1 wherein the actuator of the adjustable portion is a motor.

7. The method of claim 1 further comprising: transmitting, to a controller of the stationary bicycle device, a communication to control the actuator of the adjustable portion to adjust the size of the stationary bicycle device to correspond with the determined dimension.

8. The method of claim 1 wherein the adjustable portion of the stationary exercise bicycle comprises at least one of: an adjustable vertically oriented post;
   a seat assembly adjustable forwardly or rearwardly relative to a first end of a top tube; and a handlebar assembly adjustable forwardly or rearwardly relative to a second end of the top tube.

9. The method of claim 8 wherein the adjustable portion of the stationary exercise bicycle further comprises at least one of: a vertically adjustable post of the seat assembly that is adjustable vertically relative to the first end of the top tube; and a vertically adjustable post of the handlebar assembly that is adjustable vertically relative to the second end of the top tube.

10. A non-transitory computer-readable storage medium having computer-executable program instructions stored thereon that when executed by a processor, cause the processor to:
    display a digital photographic image of a reference non-stationary bicycle;
    receive, from an input device, a first input identifying a first aspect of the reference non-stationary bicycle in the digital photographic image and a second input identifying a second aspect of the reference non-stationary bicycle in the digital photographic image, wherein a distance within the digital photographic image between a location of the first aspect and a location of the second aspect of the reference non-stationary bicycle is determined, and wherein a dimension of the reference non-stationary bicycle is calculated from the determined distance;
    determine, based on the calculated dimension of the reference non-stationary bicycle, a setting of an adjustable feature of a stationary exercise bicycle to alter a dimension of the stationary exercise bicycle, the setting corresponding to a translation of the calculated dimension of the reference non-stationary bicycle to a corresponding dimension of the stationary exercise bicycle; and
    control, based on the setting of the adjustable feature, an actuator of the stationary exercise bicycle to alter the dimension of the stationary bicycle device to correspond with the calculated dimension of the reference non-stationary bicycle.

11. The non-transitory computer-readable storage medium of claim 10, wherein the instructions further cause the processor to:
display a component of the reference non-stationary bicycle within a portion of the digital photographic image, wherein one of the first input or the second input identifies the component as the first aspect or the second aspect of the reference non-stationary bicycle, respectively, within the digital photographic image.

12. The non-transitory computer-readable storage medium of claim 11, wherein the instructions further cause the processor to:
receive, via the input device, a user input of a reference distance between the first aspect and the second aspect of the reference non-stationary bicycle;
calculate a correlation ratio comprising a difference of the determined distance within the digital photographic image and the reference distance of the reference non-stationary bicycle.

13. The non-transitory computer-readable storage medium of claim 12, wherein the instructions further cause the processor to:
determine, based on the correlation ratio, a plurality of estimated dimensions of the reference non-stationary bicycle; and
correlate the plurality of estimated dimensions of the reference non-stationary bicycle to a plurality of dimensions of the stationary exercise bicycle.

14. The non-transitory computer-readable storage medium of claim 12, wherein the instructions further cause the processor to:
transmit a communication to control the actuator of the stationary exercise bicycle to alter the dimension of the stationary bicycle device to correspond with the determined dimension of the reference non-stationary bicycle.

* * * * *